(12) United States Patent
Zhang et al.

(10) Patent No.: US 7,551,664 B2
(45) Date of Patent: Jun. 23, 2009

(54) ITERATIVE AND TURBO-BASED METHOD AND APPARATUS FOR EQUALIZATION OF SPREAD-SPECTRUM DOWNLINK CHANNELS

(75) Inventors: Jianzhong (Charlie) Zhang, Irving, TX (US); Hoang Nguyen, Davis, CA (US); Giridhar Mandyam, Plano, TX (US); Joe Dowling, Athlone (IE)

(73) Assignee: Nokia Corporation, Espoo (FI)

( * ) Notice: Subject to any disclaimer, the term of this patent is extended or adjusted under 35 U.S.C. 154(b) by 747 days.

(21) Appl. No.: 10/943,565

(22) Filed: Sep. 17, 2004

(65) Prior Publication Data

US 2006/0062283 A1    Mar. 23, 2006

(51) Int. Cl.
*H04B 1/00*    (2006.01)
(52) U.S. Cl. .................. 375/147; 375/148; 375/140
(58) Field of Classification Search .............. 375/147, 375/148, 140
See application file for complete search history.

(56) References Cited

U.S. PATENT DOCUMENTS

| | | | | |
|---|---|---|---|---|
| 5,659,573 | A * | 8/1997 | Bruckert et al. | 375/142 |
| 6,556,557 | B1 * | 4/2003 | Cimini et al. | 370/342 |
| 6,690,723 | B1 * | 2/2004 | Gosse et al. | 375/233 |
| 2004/0165675 | A1 * | 8/2004 | Ito et al. | 375/267 |
| 2004/0223480 | A1 * | 11/2004 | Nguyen et al. | 370/342 |
| 2005/0089112 | A1 * | 4/2005 | Piechocki et al. | 375/267 |

OTHER PUBLICATIONS

Jianzhong (Charlie) Zhang, Hoang Nguyen, Giridhar Mandyam; *LMMSE-Based Iterative and Turbo Equalization Methods for CDMA Downlink Channels*; 2005; pp. 231-235; IEEE 6th Workshop on Signal Processing Advances in Wireless Communications; 2005 IEEE.
Y. Sun, M. Yee, M. Sandell; *Iterative Channel Estimation with MIMO MMSE-Turbo Equalisation*; Vehicular Technology Conference; 2003; pp. 1278-1282; vol. 2; 2003 IEEE.
Eric Hardouin, Christophe Laot; *Iteractive Channel Equalization for the Multicode DS-CDMA Downlink*; Vehicular Technology Conference; 2003; pp. 1857-1861; vol. 3; 2003 IEEE.
Jurgen Robler, Johannes Huber; *MMSE-Based Iterative Equalization with Soft Feedback for Transmission with General Square QAM Constellations*; International Conference on Publ. 2003; pp. 3267-3271; vol. 5; 2003 IEEE.

* cited by examiner

*Primary Examiner*—David C Payne
*Assistant Examiner*—Brian J Stevens
(74) *Attorney, Agent, or Firm*—Alston & Bird LLP

(57) ABSTRACT

A system, terminal, receiver and method are provided for receiving and processing a signal received from a spread-spectrum downlink channel. The method includes receiving the signal from the downlink channel, and generating an estimate of a transmitted chip sequence in accordance with an iterative process. In this regard, the iterative process includes calculating statistical information, such as a mean and covariance, for a previous iteration of a transmitted chip sequence, the statistical information being selectively calculated based upon one of soft bits and soft symbols associated with the previous iteration of the transmitted chip sequence. The estimate for a current iteration of the chip sequence is then generated based upon the statistical information.

34 Claims, 9 Drawing Sheets

POWER PROFILE FOR CELL OF COMMUNICATION SYSTEM

PERFORMANCE OF ITERATIVE RECEIVER FOR QPSK32 CASE

PERFORMANCE OF TURBO RECEIVER FOR QPSK32 CASE

PERFORMANCE OF ITERATIVE RECEIVER FOR QAM65 CASE

PERFORMANCE OF TURBO RECEIVER FOR QAM65 CASE

PERFORMANCE OF ITERATIVE RECEIVER FOR QAM65 CASE WITH BIASED CHIP RE-ESTIMATE

PERFORMANCE OF ITERATIVE RECEIVER FOR QAM102 CASE
WITHOUT INTERFERENCE SOFT-SYMBOL FEEDBACK

PERFORMANCE OF ITERATIVE RECEIVER FOR QAM102 CASE WITH
INTERFERENCE SOFT-SYMBOL FEEDBACK

PERFORMANCE OF ITERATIVE RECEIVER MCS NUMBER 9

PERFORMANCE OF ITERATIVE RECEIVER MCS NUMBER 11

PERFORMANCE OF ITERATIVE RECEIVER MCS NUMBER 12

ITERATIVE AND TURBO-BASED METHOD AND APPARATUS FOR EQUALIZATION OF SPREAD-SPECTRUM DOWNLINK CHANNELS

FIELD OF THE INVENTION

The present invention generally relates to spread-spectrum receivers and methods of receiving spread-spectrum signals, and more particularly relates to channel equalizers for use in code division multiple access (CDMA) downlink receivers and methods of performing equalization of CDMA downlink channels.

BACKGROUND OF THE INVENTION

A central problem in designing and implementing a data transmission system is the simultaneous transmission and reception of signals from several simultaneous users such that the signals interfere with one another as little as possible. Because of this and the transmission capacity used, various transmission protocols and multiple access methods have been used, the most common especially in mobile phone traffic being FDMA (Frequency Division Multiple Access) and TDMA (Time Division Multiple Access), and recently CDMA (Code Division Multiple Access).

Among the various transmission protocols, CDMA is a multiple access method based on a spread spectrum technique, and has been recently put into use in cellular radio systems in addition to previously used FDMA and TDMA. In this regard, CDMA has many advantages over the prior methods, such as simplicity of frequency planning, and spectrum efficiency.

In a CDMA method, a narrow-band data signal of a user is multiplied to a relatively broad band by a spreading code having a much broader band than the data signal. Bandwidths used in known test systems include, for example, 1.25 MHz, 10 MHz and 25 MHz. The multiplication spreads the data signal over the entire band to be used. All the users transmit simultaneously on the same frequency band. A different spreading code is used on each connection between a base station and a mobile station, and the signals of the users can be distinguished from one another in the receivers on the basis of the spreading code of the user. If possible, the spreading codes are selected in such a way that they are mutually orthogonal, i.e., they do not correlate with one another.

Correlators in conventionally implemented CDMA receivers are synchronized with a desired signal, which they recognize on the basis of the spreading code. In the receiver the data signal is restored to the original band by multiplying it by the same spreading code as in the transmission step. Ideally, the signals that have been multiplied by some other spreading code do not correlate and are not restored to the narrow band. In view of the desired signal, they thus appear as noise. The object is to detect the signal of the desired user from among a number of interfering signals. In practice, the spreading codes do correlate to some extent, and the signals of the other users make it more difficult to detect the desired signal by distorting the received signal. This interference caused by the users to one another is called multiple access interference.

The situation is especially problematic when one or several users transmit with a considerably greater signal strength than the other users. These users employing greater signal strength interfere considerably with the connections of the other users. Such a situation is called a near-far problem, and it may occur for example in cellular radio systems when one or several users are situated near the base station and some users are further away, whereupon the users that are situated closer blanket the signals of the other users in the base station receiver, unless the power control algorithms of the system are very fast and efficient.

The reliable reception of signals is problematic especially in asynchronous systems, that is, systems where the signals of the users are not synchronized with one another, since the symbols of the users are disturbed by the several symbols of the other users. In conventional receivers, filters matched with the spreading codes, and sliding correlators, which are both used as detectors, do not function well in near-far situations. Of the known methods the best result is provided by a decorrelating detector, which eliminates multiple access interference from the received signal by multiplying it by the cross-correlation matrix of the spreading codes used. The decorrelating detector is described in greater detail in R. Lupas & S. Verdu, *Linear Multiuser Detector for Synchronous Code-Division Multiple-Access Channels*, 35 IEEE Trans. Info. Theory 123-136 (January 1989); and R. Lupas & S. Verdu, *Near-Far Resistance of Multiuser Detectors in Asynchronous Channels*, 38 IEEE Trans. on Comm. 496-508 (April 1990). These methods, however, also involve many operations, such as matrix inversion operations, that require a high calculating capacity and that are especially demanding when the quality of the transmission channel and the number of the users vary constantly, as for example in cellular radio systems.

Channel equalization is a promising means of improving the downlink receiver performance in a frequency selective CDMA downlink. Current research encompasses two types of linear equalization, namely non-adaptive linear equalization and adaptive linear equalization. Non-adaptive linear equalizers usually assumes "piece-wise" stationarity of the channel and designs the equalizer according to some optimization criteria such as LMMSE (Least Minimum Mean Squared Error) or zero-forcing, which in general leads to solving a system of linear equations by matrix inversion. This can be computationally expensive, especially when the coherence time of the channel is short and the equalizers have to be updated frequently. On the other hand, adaptive algorithms solve the similar LMMSE or zero-forcing optimization problems by means of stochastic gradient algorithms and avoid direct matrix inversion. Although computationally more manageable, the adaptive algorithms are less robust since their convergence behavior and performance depend on the choices of parameters such as step size.

The art still has need of an equalization procedure that is robust and does not consume a great deal of computation power.

SUMMARY OF THE INVENTION

In light of the foregoing background, embodiments of the present invention provide an improved system, terminal, receiver and method of processing a signal received from a spread-spectrum downlink channel. The receiver of embodiments of the present invention, referred to as a "turbo/iterative" receiver, achieves a desirable tradeoff between complexity and performance of the terminal, and thus the system, of embodiments of the present invention. To achieve this desirable tradeoff, the turbo/iterative receiver is capable of selectively operating with soft-bit (turbo) feedback or soft-symbol (iterative) feedback. The feedback can then be provided to a filter that is updated for iterations of a transmitted chip sequence. To mitigate the impact of error propagation, statistical information calculated based upon the feedback from one iteration can be incorporated into the re-calculation of the filter in the next iteration. The turbo/iterative receiver can therefore achieve significant performance gain compared with conventional, non-iterative LMMSE equalizers. In various instances, after 3-4 iterations, performance of the turbo/iterative receiver of embodiments of the present invention is within 1 dB of the theoretical limit, the matched filter bound.

According to one aspect of the present invention, a method is provided for processing a signal received from a spread-spectrum downlink channel. The method includes receiving the signal from the downlink channel, and generating an estimate of a transmitted chip sequence in accordance with an iterative process. In this regard, the iterative process includes calculating statistical information, such as a mean and covariance, for a previous iteration of a transmitted chip sequence, the statistical information being selectively calculated based upon one of soft bits and soft symbols associated with the previous iteration of the transmitted chip sequence. An estimate for a current iteration of the chip sequence, such as a conditionally unbiased estimate, is thereafter generated based upon the statistical information.

The mean and covariance can be calculated in a number of different manners. For example, the mean and covariance for a previous iteration of a transmitted chip sequence can be calculated based upon a chip-level mean and covariance for a previous iteration of the transmitted chip sequence. In such an instance, the chip-level mean and covariance are calculated based upon a symbol-level mean and covariance for the previous iteration.

In a more particular example, the mean for a previous iteration, $\bar{d}_i^{u-1}$, can be calculated in accordance with the following:

$$\bar{d}_i^{u-1} = E[d_i | L^{u-1}]$$

Likewise, the covariance for a previous iteration, $c_i^{u-1}$, can be calculated in accordance with the following:

$$c_i^{u-1} = E[|d_i - \bar{d}_i^{u-1}|^2 | L^{u-1}]$$

In the preceding equations, i represents a chip index, u represents an iteration, $d_i$ represents the transmitted chip sequence, $L^{u-1}$ represents feedback from a previous iteration, and $E[\bullet|\bullet]$ represents a conditional expectation.

The statistical information can be selectively calculated based upon a type of spread-spectrum communication (e.g., CDMA, 1X-EVDV, 1X-EVDO, HSDPA, etc.) according to which the signal is received from the downlink channel. Further, if so desired, the statistical information can be selectively calculated further based upon a modulation (e.g., QPSK, QAM, etc.) of the signal received from the downlink channel.

According to other aspects of the present invention a system, terminal and receiver are provided for receiving a signal from a spread-spectrum downlink channel. Embodiments of the present invention therefore provide an improved system, terminal, receiver and method and computer program product for receiving and processing a signal from a spread-spectrum downlink channel. Embodiments of the present invention are capable of processing the signals by selectively operating with soft-bit (turbo) feedback or soft-symbol (iterative) feedback. The feedback can then be provided to a filter that is updated for iterations of a transmitted chip sequence. Embodiments of the present invention thus achieve a desirable tradeoff between complexity and performance in processing signals from a spread-spectrum downlink channel. As such, the system, terminal, receiver and method of embodiments of the present invention solve the problems identified by prior techniques and provide additional advantages.

BRIEF DESCRIPTION OF THE DRAWINGS

Figure 1:
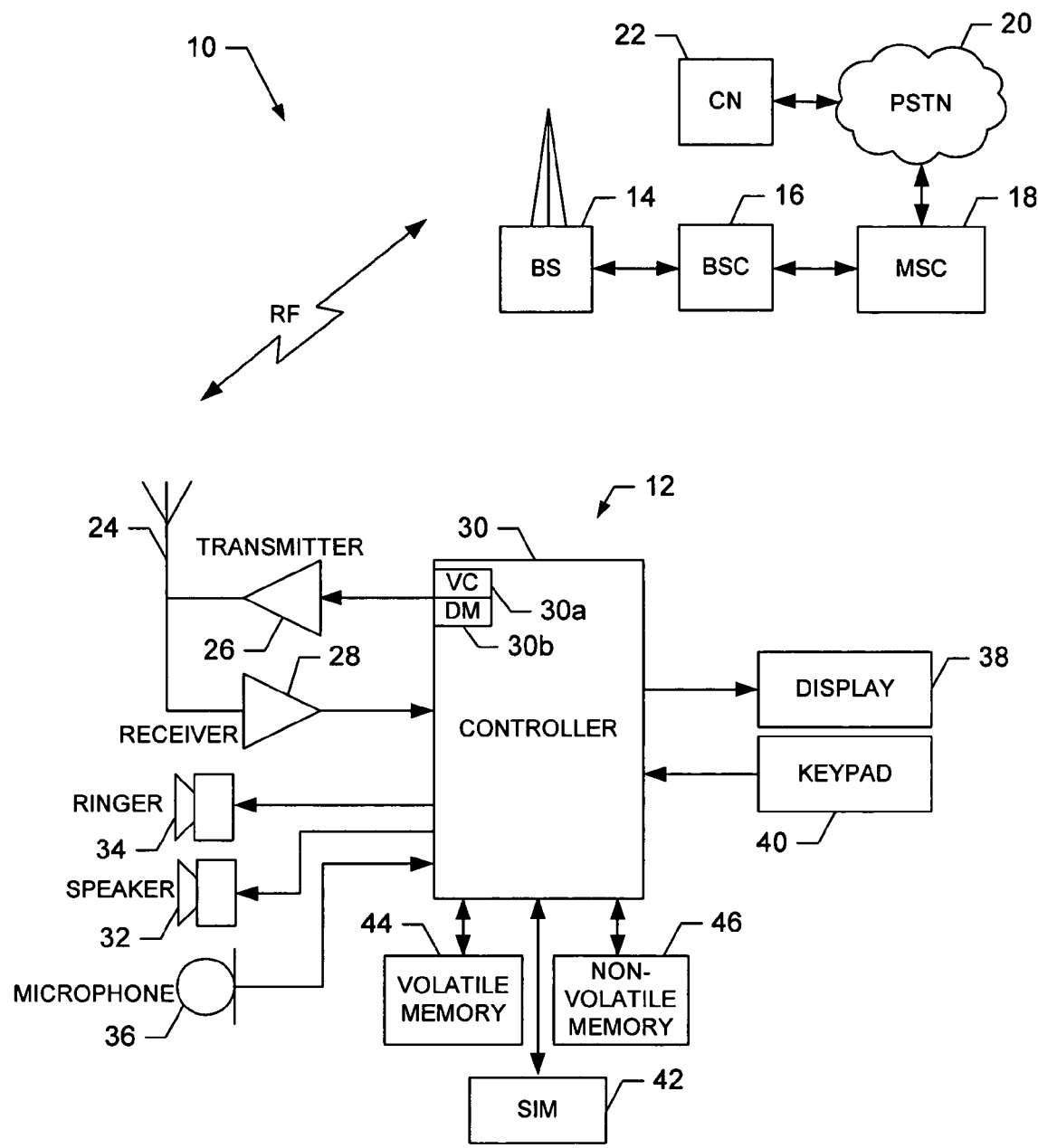
Figure 2:
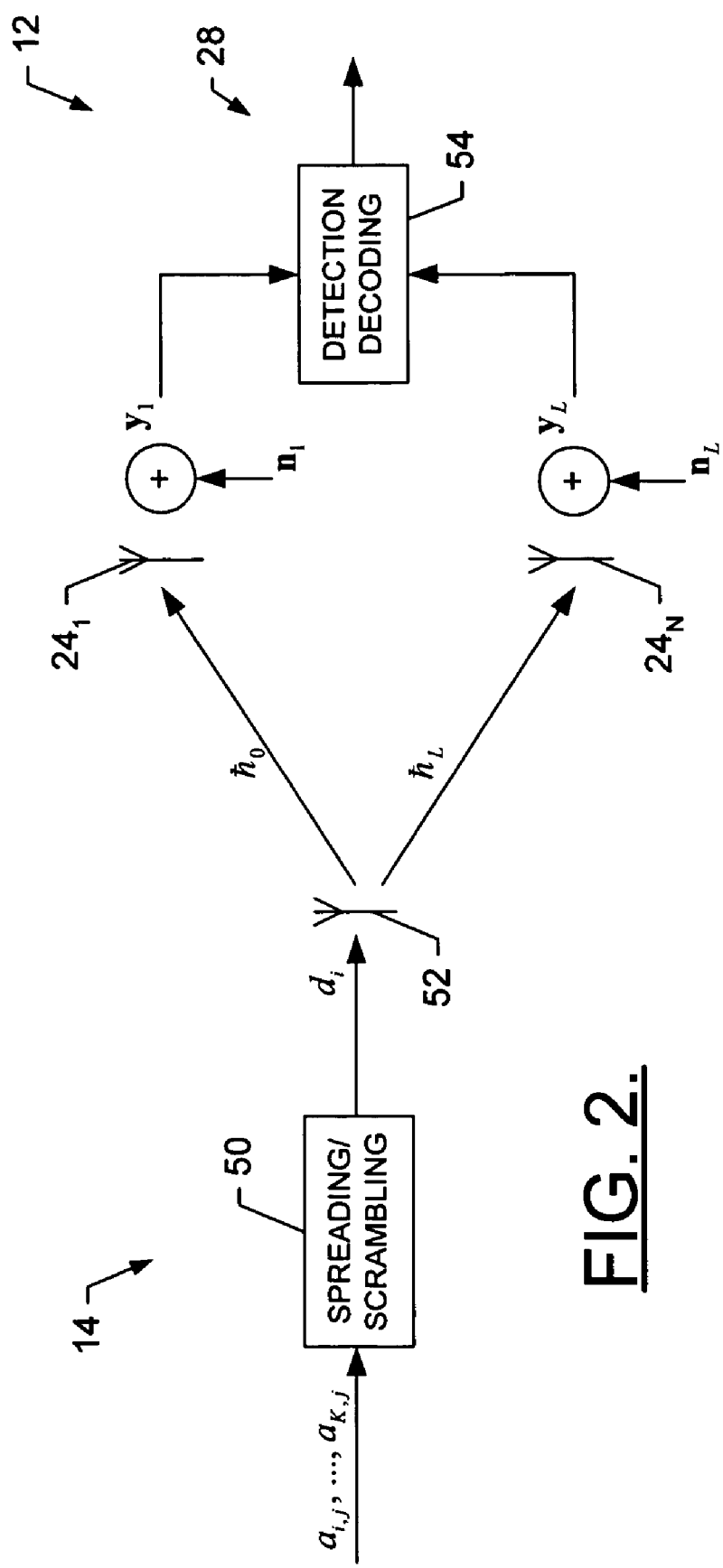
Figure 3:
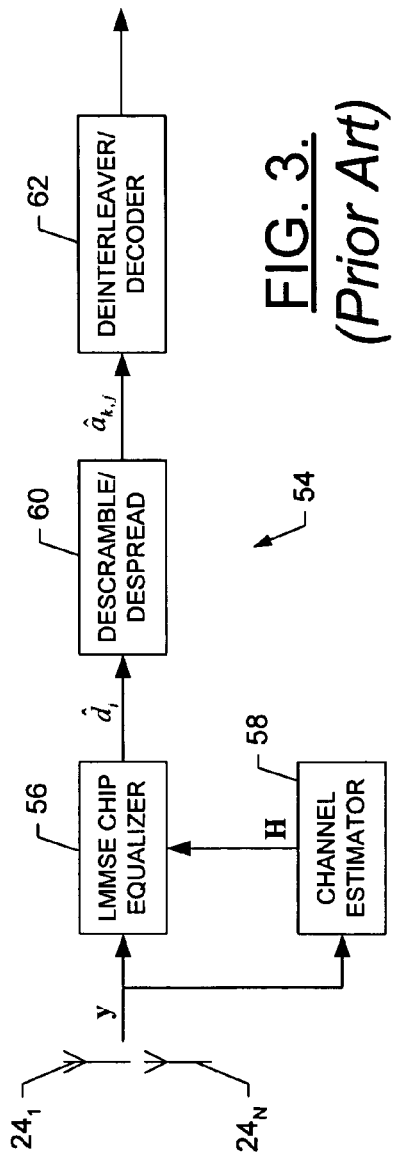
Figure 4:
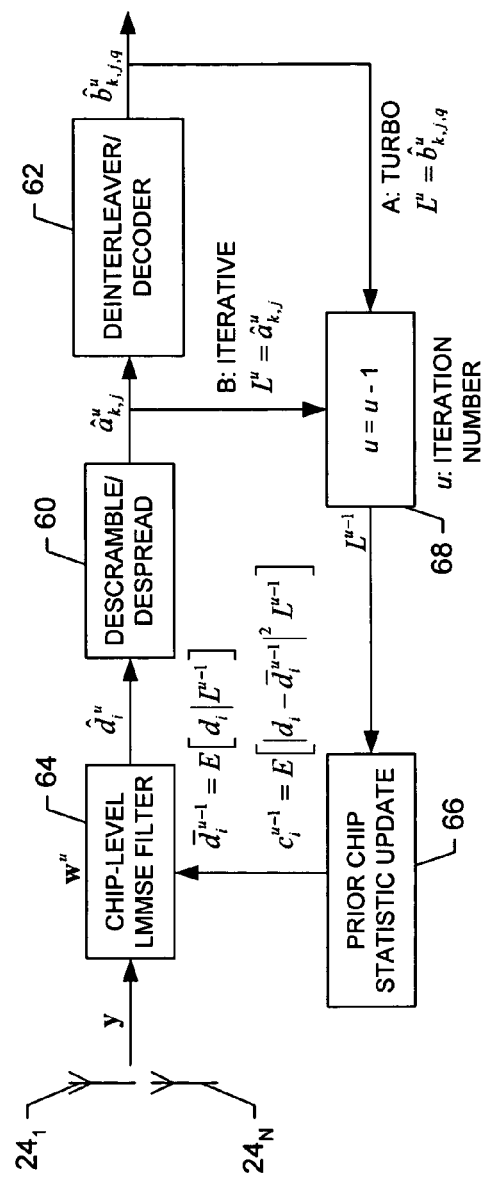
Figure 5:
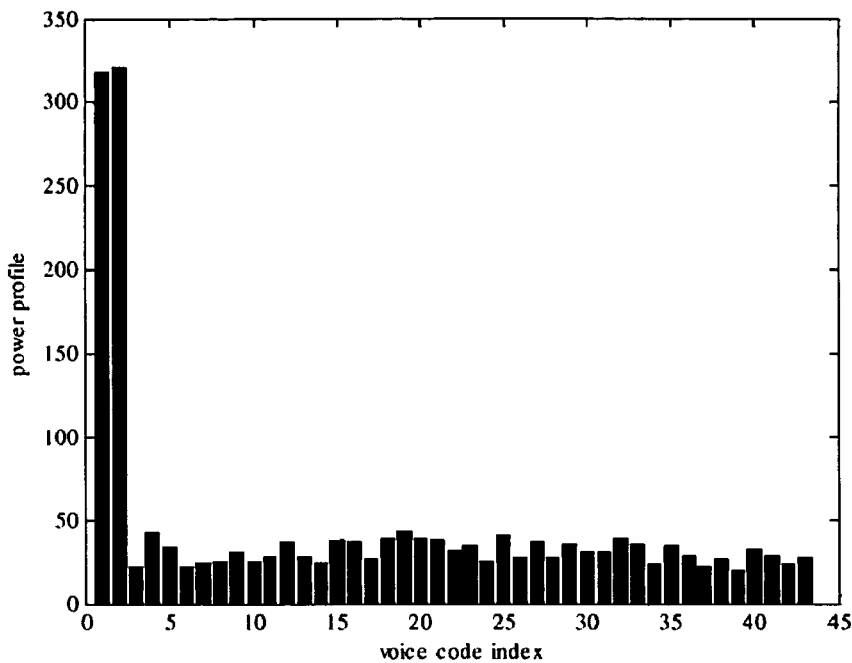
Figure 6:
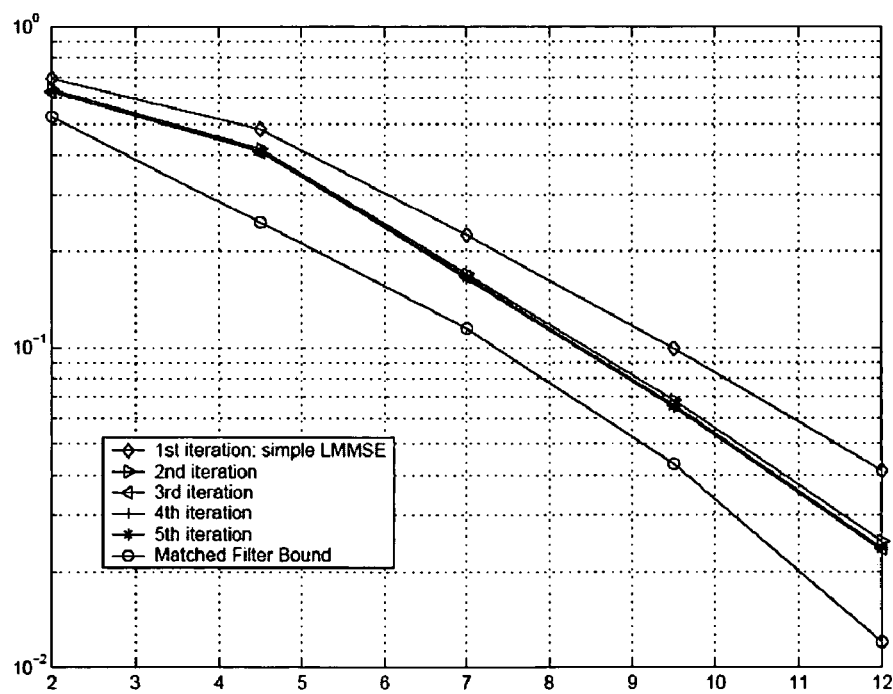
Figure 7:
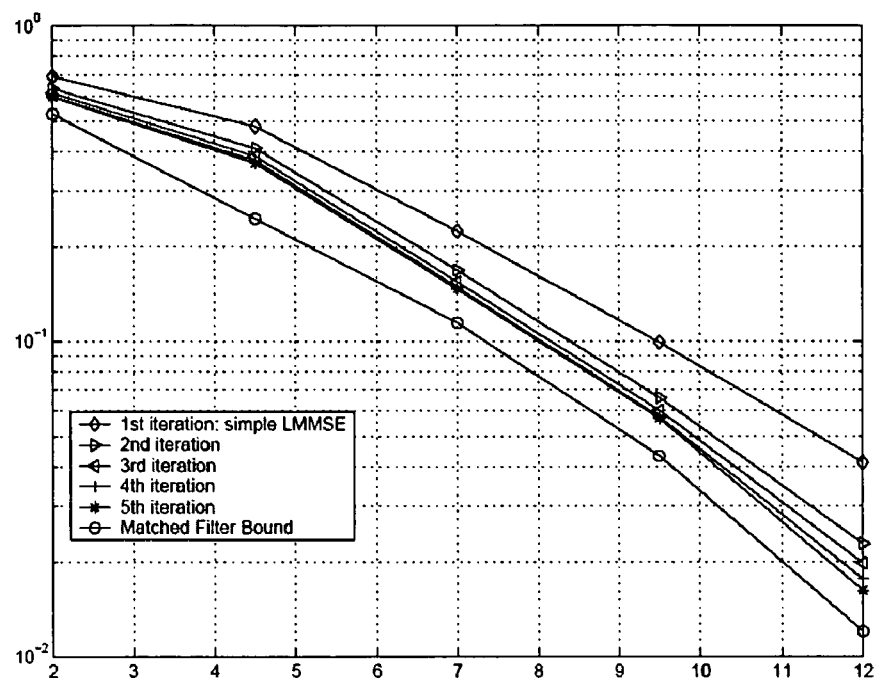
Figure 8:
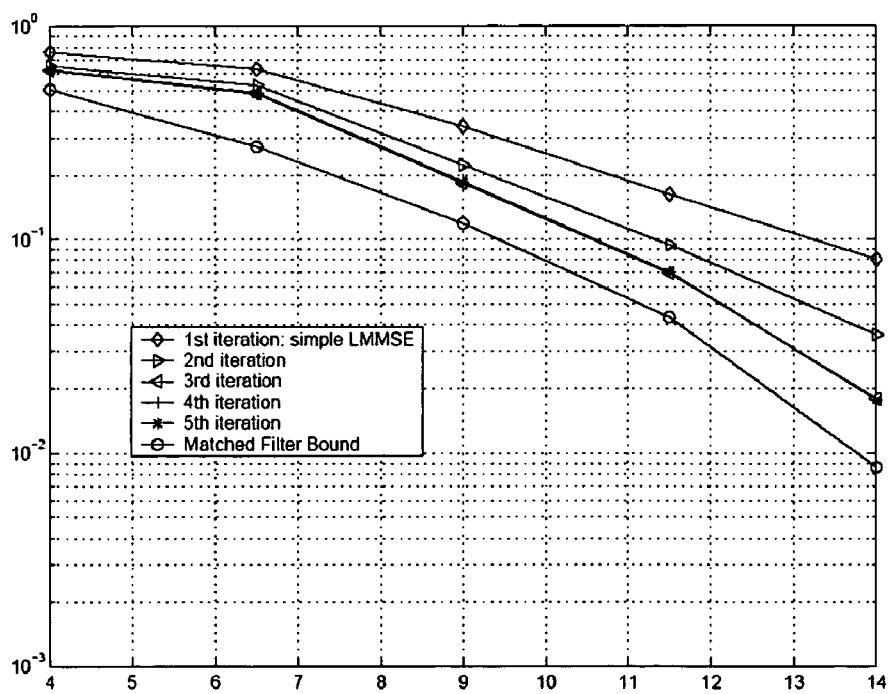
Figure 9:
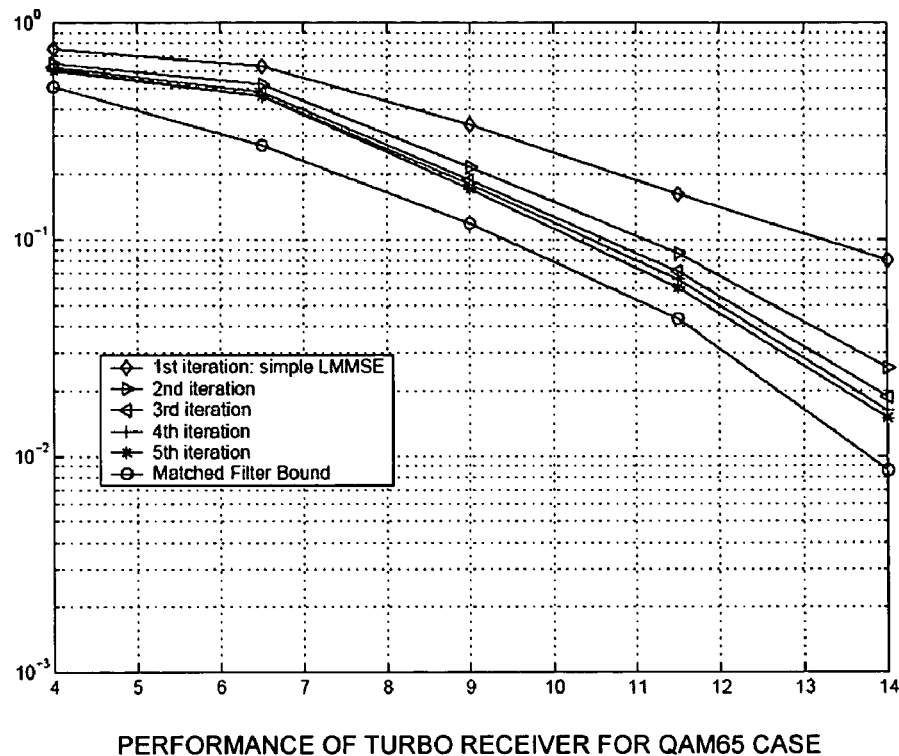
Figure 10:
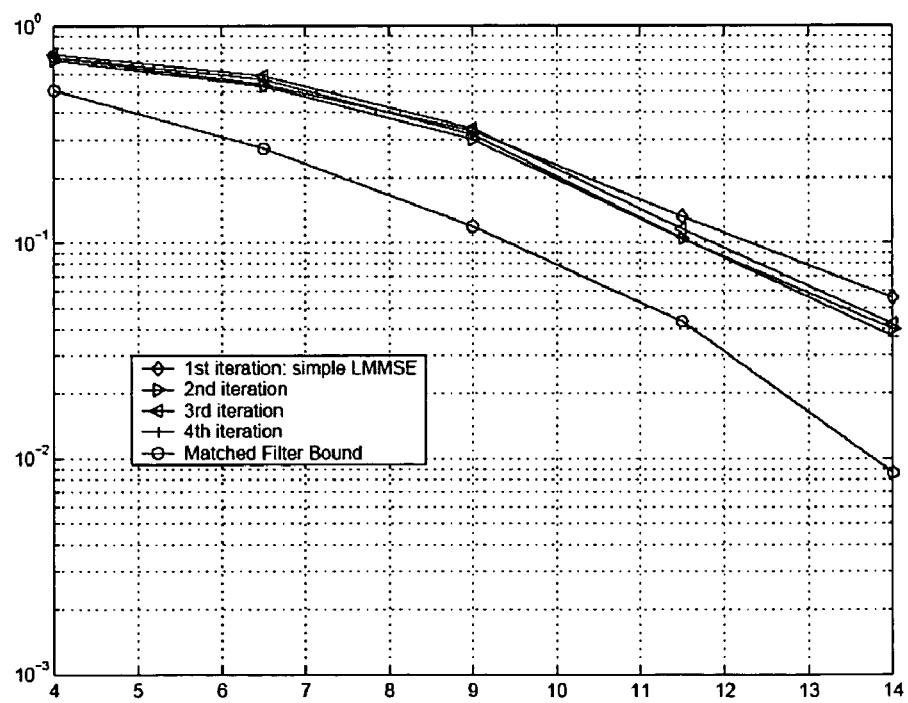
Figure 11:
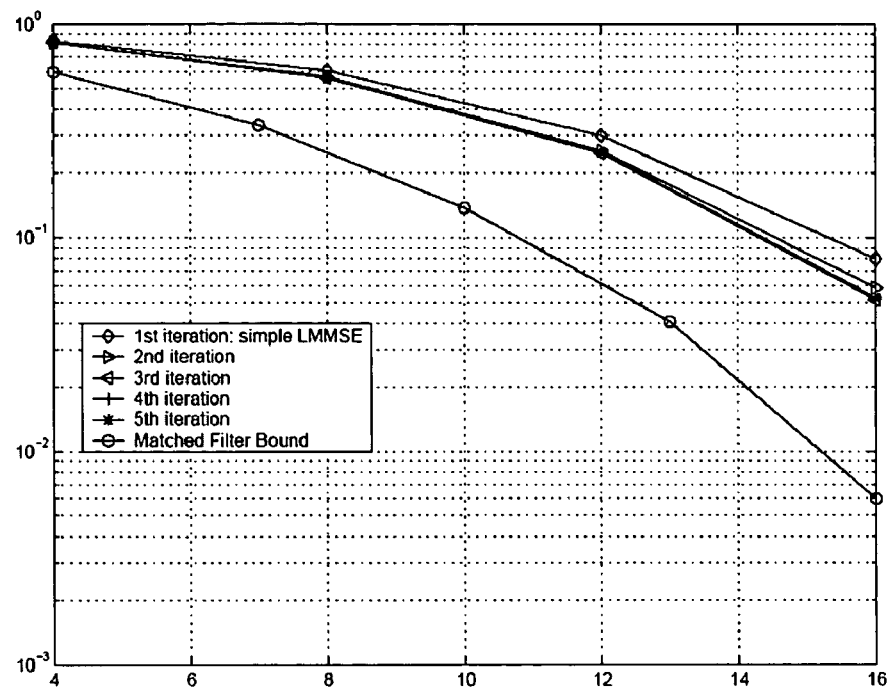
Figure 12:
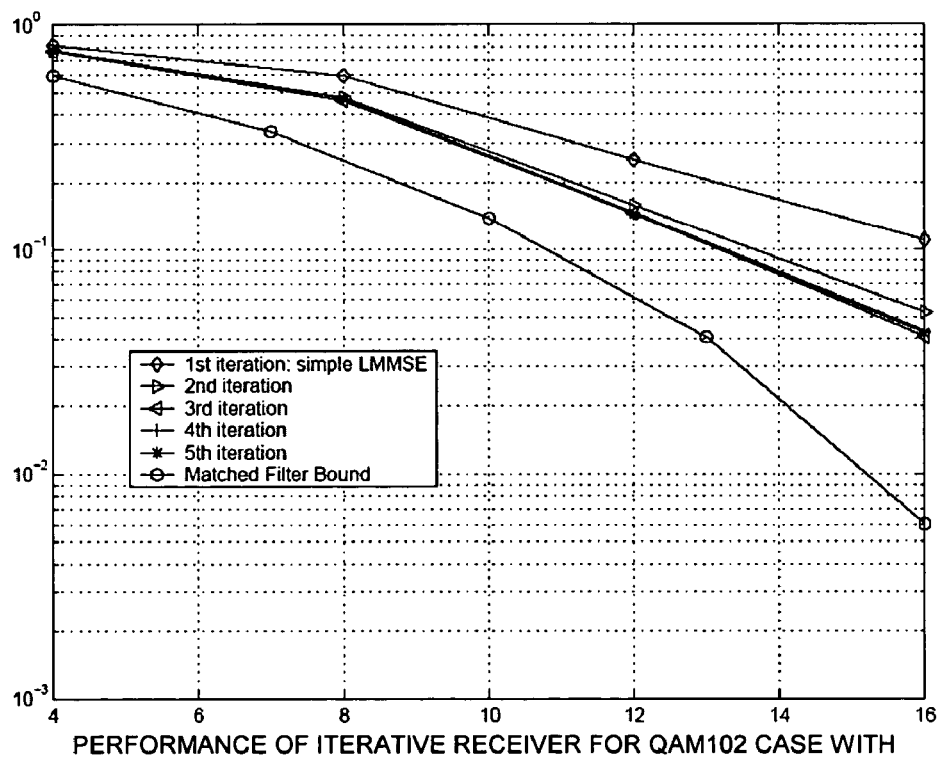
Figure 13:
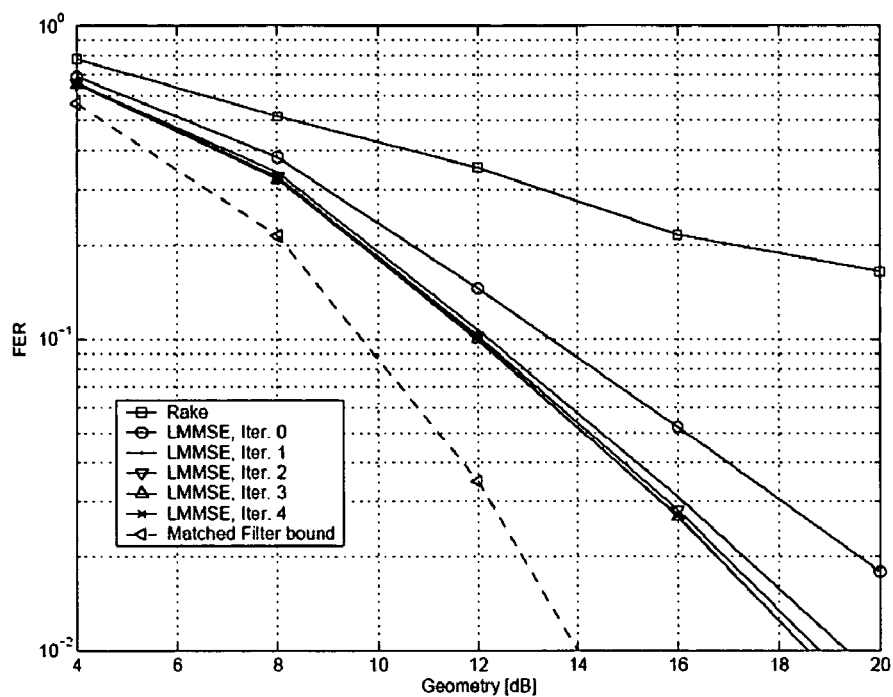
Figure 14:
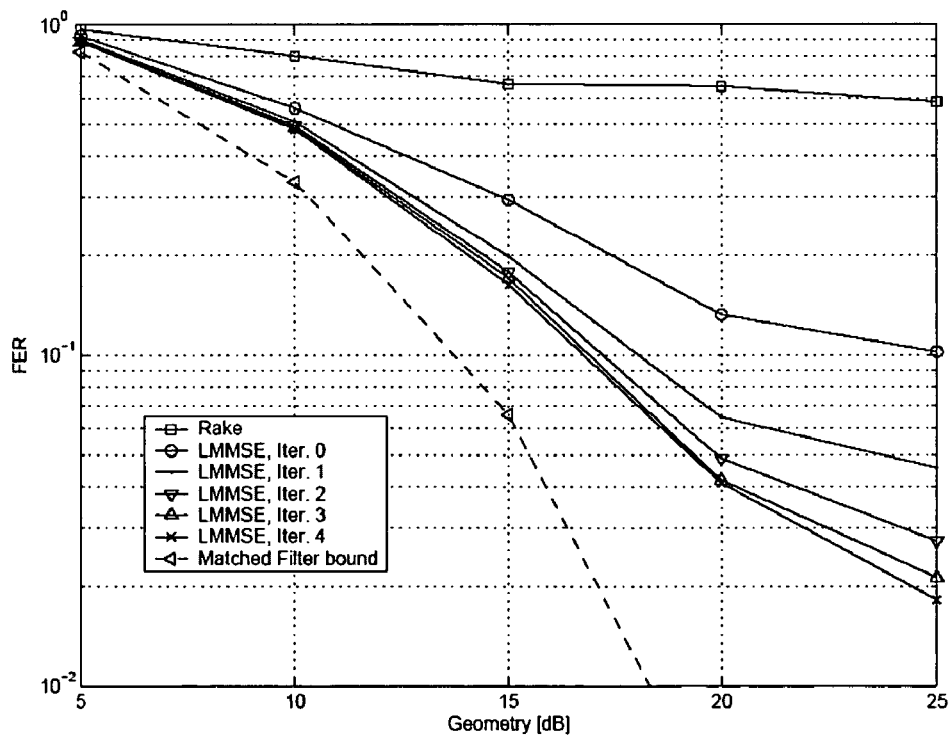
Figure 15:
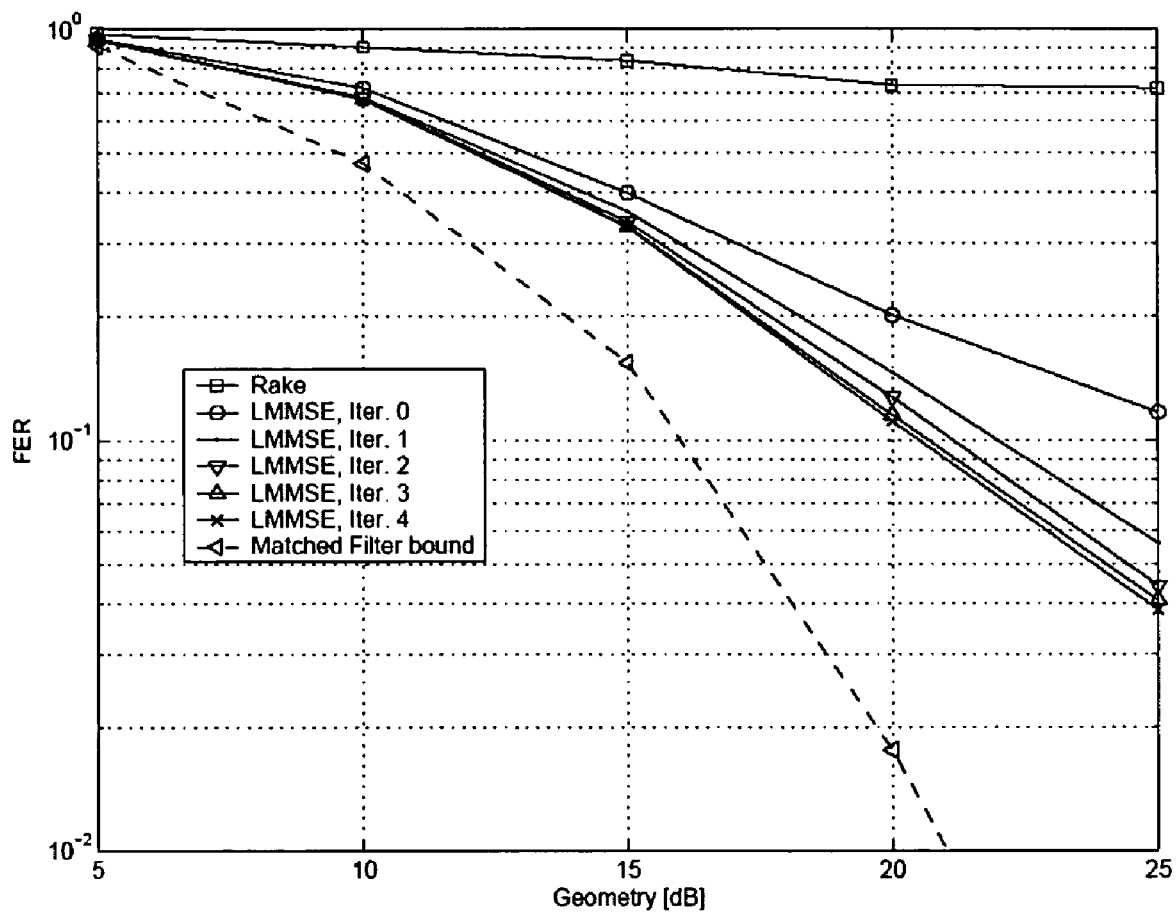

Having thus described the invention in general terms, reference will now be made to the accompanying drawings, which are not necessarily drawn to scale, and wherein:

FIG. 1 illustrates a schematic block diagram of a wireless communication system including a terminal, according to one embodiment of the present invention;

FIG. 2 is a schematic functional block diagram of the wireless communication system of FIG. 1, the system including single-input multiple-output (SIMO) channel, a multipath SIMO channel, and a SIMO receiver;

FIG. 3 is a schematic block diagram of a detection/decoding block of a conventional terminal receiver;

FIG. 4 is a schematic block diagram of a detection/decoding block of a turbo/iterative terminal receiver, in accordance with one embodiment of the present invention;

FIG. 5 is a bar graph illustrating the power profile for operation of a communication system in accordance with an embodiment of the present invention, where a cell of the communication system includes two voice users (terminals);

FIGS. 6 and 7 are graphs illustrating performance of the turbo/iterative receiver of one embodiment of the present invention operating with soft-symbol (iterative) feedback and soft-bit (turbo) feedback, respectively, in a simulated 1X-EVDV system, the receiver receiving QPSK32 modulated signals;

FIGS. 8 and 9 are graphs illustrating performance of the turbo/iterative receiver of one embodiment of the present invention operating with soft-symbol (iterative) feedback and soft-bit (turbo) feedback, respectively, in a simulated 1X-EVDV system, the receiver receiving QAM65 modulated signals;

FIG. 10 is a graph illustrating performance of the turbo/iterative receiver of one embodiment of the present invention operating with soft-symbol (iterative) feedback and biased chip re-estimate in a simulated 1X-EVDV system, the receiver receiving QAM65 modulated signals;

FIGS. 11 and 12 are graphs illustrating performance of the turbo/iterative receiver of one embodiment of the present invention operating without and with soft-symbol (iterative) feedback, respectively, in a simulated 1X-EVDV system, the receiver receiving QAM102 modulated signals; and FIGS. 13, 14 and 15 are graphs illustrating performance of the turbo/iterative receiver of one embodiment of the present invention operating with soft-symbol (iterative) feedback in a simulated 1X-EVDO system, the receiver receiving signals under different modulation and coding schemes (MCS).

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, an illustration of one type of wireless communications system 10 including a terminal 12 that would benefit from the present invention is provided. As explained below, the terminal may comprise a mobile telephone. It should be understood, however, that such a mobile telephone is merely illustrative of one type of terminal that would benefit from the present invention and, therefore, should not be taken to limit the scope of the present invention. While several embodiments of the terminal are illustrated and will be hereinafter described for purposes of example, other types of terminals, such as portable digital assistants (PDAs), pagers, laptop computers and other types of voice and text communications systems, can readily employ the present invention. In addition, the system and method of the present invention will be primarily described in conjunction with mobile communications applications. It should be understood, however, that the system and method of the present invention can be utilized in conjunction with a variety of other applications, both in the mobile communications industries and outside of the mobile communications industries.

The communication system 10 provides for radio communication between two communication stations, such as a base station (BS) 14 and the terminal 12, by way of radio links formed therebetween. The terminal is configured to receive and transmit signals to communicate with a plurality of base stations, including the illustrated base station. The communication system can be configured to operate in accordance with one or more of a number of different types of spread-spectrum communication, or more particularly, in accordance with one or more of a number of different types of spread spectrum communication protocols. More particularly, the communication system can be configured to operate in accordance with any of a number of 1G, 2G, 2.5G and/or 3G communication protocols or the like. For example, the communication system may be configured to operate in accordance with 2G wireless communication protocols IS-95 (CDMA) and/or cdma2000. Also, for example, the communication system may be configured to operate in accordance with 3G wireless communication protocols such as Universal Mobile Telephone System (UMTS) employing Wideband Code Division Multiple Access (WCDMA) radio access technology. Further, for example, the communication system may be configured to operate in accordance with enhanced 3G wireless communication protocols such as 1X-EVDO (TIA/EIA/IS-856) and/or 1X-EVDV. It should be understood that operation of the embodiment of the present invention is similarly also possible in other types of radio, and other, communication systems. Therefore, while the following description may describe operation of an embodiment of the present invention with respect to the aforementioned wireless communication protocols, operation of an embodiment of the present invention can analogously be described with respect to any of various other types of wireless communication protocols, without departing from the spirit and scope of the present invention.

The base station 14 is coupled to a base station controller (BSC) 16. And the base station controller is, in turn, coupled to a mobile switching center (MSC) 18. The MSC is coupled to a network backbone, here a PSTN (public switched telephonic network) 20. In turn, a correspondent node (CN) 22 is coupled to the PSTN. A communication path is formable between the correspondent node and the terminal 12 by way of the PSTN, the MSC, the BSC and base station, and a radio link formed between the base station and the terminal. Thereby, the communications, of both voice data and non-voice data, are effectual between the CN and the terminal. In the illustrated, exemplary implementation, the base station defines a cell, and numerous cell sites are positioned at spaced-apart locations throughout a geographical area to define a plurality of cells within any of which the terminal is capable of radio communication with an associated base station in communication therewith.

As shown, in addition to one or more antennas 24, the terminal 12 of one embodiment of the present invention can include a transmitter 26, receiver 28, and controller 30 or other processor that provides signals to and receives signals from the transmitter and receiver, respectively. These signals include signaling information in accordance with the communication protocol(s) of the wireless communication system, and also user speech and/or user generated data. In this regard, the terminal can be capable of communicating in accordance with one or more of a number of different wireless communication protocols, such as those indicated above. Although not shown, the terminal can also be capable of communicating in accordance with one or more wireline and/or wireless networking techniques. More particularly, for example, the terminal can be capable of communicating in accordance with local area network (LAN), metropolitan area network (MAN), and/or a wide area network (WAN) (e.g., Internet) wireline networking techniques. Additionally or alternatively, for example, the terminal can be capable of communicating in accordance with wireless networking techniques including wireless LAN (WLAN) techniques such as IEEE 802.11, and/or WiMAX techniques such as IEEE 802.16 or the like.

It is understood that the controller 30 includes the circuitry required for implementing the audio and logic functions of the terminal 12. For example, the controller may be comprised of a digital signal processor device, a microprocessor device, and/or various analog-to-digital converters, digital-to-analog converters, and other support circuits. The control and signal processing functions of the terminal are allocated between these devices according to their respective capabilities. The controller can additionally include an internal voice coder (VC) 30a, and may include an internal data modem (DM) 30b. Further, the controller may include the functionality to operate one or more software applications, which may be stored in memory (described below).

The terminal 12 can also include a user interface including a conventional earphone or speaker 32, a ringer 34, a microphone 36, a display 38, and a user input interface, all of which are coupled to the controller 18. The user input interface, which allows the terminal to receive data, can comprise any of a number of devices allowing the terminal to receive data, such as a keypad 40, a touch display (not shown) or other input device. In embodiments including a keypad, the keypad includes the conventional numeric (0-9) and related keys (#, *), and other keys used for operating the terminal. Although not shown, the terminal can include one or more means for sharing and/or obtaining data (not shown).

In addition, the terminal 12 can include memory, such as a subscriber identity module (SIM) 42, a removable user identity module (R-UIM) or the like, which typically stores information elements related to a mobile subscriber. In addition to the SIM, the terminal can include other removable and/or fixed memory. In this regard, the terminal can include volatile memory 44, such as volatile Random Access Memory (RAM) including a cache area for the temporary storage of data. The terminal can also include other non-volatile memory 46, which can be embedded and/or may be removable. The non-volatile memory can additionally or alternatively comprise an EEPROM, flash memory or the like. The memories can store any of a number of software applications, instructions, pieces of information, and data, used by the terminal to implement the functions of the terminal.

Reference is now made to FIG. 2, which illustrates a functional block diagram of the system 10 of FIG. 1 in accordance with one embodiment of the present invention. More particularly, FIG. 2 illustrates a functional block diagram of the system operating as a single in/multiple out (SIMO) communication system. In such a SIMO communication system, the base station 14 includes a SIMO transmitter having a spreading/scrambling element 50 and a transmit antenna 52. The spreading/scrambling element receives an input modulated (e.g. QPSK (quadrature phase shift keying) or QAM (quadrature amplitude modulation)) symbol stream $\alpha_1, \ldots, \alpha_K$, and provides a spread and scrambled symbol stream, $d_i$, to the transmit antenna. The transmit antenna transmits the symbol stream through a multipath downlink channel to N antennas $24_1, \ldots, 24_N$, coupled to the receiver 28 of a terminal 12. The received symbol stream can then be applied to a receiver detection/decoding element 54 of the receiver.

More particularly, assuming K active Walsh codes in the system, the signal model (chip sequence) at the transmit antenna 52 can be expressed as follows:

$$d_i = s_c(i) \sum_{k=1}^{K} \alpha_k a_{k,j} p_k(i - jG) \quad (1)$$

where i, j and k are chip, symbol and spreading code indices, respectively. Also in (1), $s_c(i)$ represents the scrambling code of the base station 14, $\alpha_k$ represents the power assigned to spreading code k (same for all antennas), $a_{k,j}$ represents the information symbol sequence for spreading code k at symbol interval j, and $p_k=[p_k(1), \ldots, p_k(G)]^T$ represents the kth spreading code. As explained herein, it has been implicitly assumed that the same set of Walsh codes are used across the transmit antennas of all base stations. It should be understood, however, that the Walsh codes may vary across one or more transmit antennas of one or more base stations.

The transmitted signal propagates through the multipath fading channel denoted by $\hbar_0, \ldots, \hbar_L$, each having the dimensions $N\Delta \times 1$ with $\Delta$ denoting the number of samples per chip. Thus, after stacking up the received samples across all the receive antennas for the ith chip interval, the signal model at the receive antennas can be given by the following equation:

$$y_i = \sum_{l=0}^{L} \hbar_l d_{i-l} + n_i \quad (2)$$

Note that $y_i = [y_{i,1}^T, \ldots, y_{i,N}^T]^T$ is of length $N\Delta$, and each small vector $y_{i,n}$ includes all the temporal samples within the ith chip interval. Meanwhile, L represents the channel memory length, $d_{i-l}$ represents the transmitted chip vector at time i−l, and $n_i$ represents the $(N\Delta) \times 1$ dimensional white Gaussian noise vector with $n_i \sim N(0, \sigma^2 I)$. Note also that $\sigma^2$ denotes noise variance and I represents the identity matrix. Further, to facilitate the following explanation of the receiver performing an equalization technique according to LMMSE (Least Minimum Mean Squared Error) optimization criteria, a block of 2F+1 received vectors can be stacked up as follows:

$$y_{i+F:i-F} = Hd_{i+F:i-F-L} + n_{i+F:i-F} \quad (3)$$

where 2F+1 represents the length of an LMMSE equalizing filter (F being a measure of the length of the LMMSE equalizing filter). As also presented in (3), $$y_{i+F:i-F} = [y_{i+F}^T, \ldots, y_{i-F}^T]^T, ((2F+1)N\Delta \times 1)$$

$$n_{i+F:i-F} = [n_{i+F}^T, \ldots, n_{i-F}^T]^T, ((2F+1)N\Delta \times 1)$$

$$d_{i+F:i-F-L} = [d_{i+F}^T, \ldots, d_{i-F-L}^T]^T, ((2F+L+1) \times 1)$$

$$H = \begin{bmatrix} \hbar_0 & \ldots & \hbar_L & & \\ & \ddots & & \ddots & \\ & & \hbar_0 & \ldots & \hbar_L \end{bmatrix}, ((2F+1)N\Delta \times (2F+L+1))$$

where the dimensions of the matrices are given next to the respective equation. Note that to keep the notation more intuitive, the subscripts can be kept at a "block" level. For example, $y_{i+F:i-F}$ represents a vector that contains blocks $y_{i+F}, \ldots, y_{i-F}$ where each block is a vector of size $N\Delta 1$.

I. LLMSE Chip-Level Equalization

Reference is now made to FIG. 3, which more particularly illustrates the detection/decoding element 54 of the receiver 28 shown in FIG. 3, in accordance with one conventional technique. As shown in FIG. 3, the conventional detection/decoding element includes a non-iterative LMMSE chip-level equalizer 56 that can receive the received vectors y, as well as a channel estimate H, which can be generated from a channel estimator 58 based upon the received vectors. For more information on such a chip-level equalizer, see A. Klein, *Data Detection Algorithms Specially Designed for the Downlink Of CDMA Mobile Radio Systems*, PROC. OF VTC 97 203-207 (1997); I. Ghauri & D. T. M. Slock, *Linear Receivers for the DS-CDMA Downlink Exploiting Orthogonality of Spreading Sequences*, PROC. OF 32ND ASILOMAR CONFERENCE 650-654 (1998); S. Werner & J. Lilleberg, *Downlink Channel Decorrelation in CDMA Systems with Long Codes*, PROC. OF 49TH VTC 1614-1617 (1999); T. P. Krauss, W. J. Hillery & M. D. Zoltowski, *MMSE Equalization for Forward Link in 3G CDMA: Symbol-Level Versus Chip-Level*, PROC. OF 10TH IEEE WORKSHOP ON STATISTICAL SIGNAL AND ARRAY PROCESSING 18-22 (2000); M. J. Heikkila, P. Komulainen & J. Lilleberg, *Interference Suppression In CDMA Downlink Through Adaptive Channel Equalization*, PROC. OF VTC 99-FALL 978-982 (1999); L. Mailaender, *Low-Complexity Implementation of CDMA Downlink Equalization*, PROC. OF 2001 IEEE 3G MOBILE COMMUNICATION TECHNOLOGIES 396-400 (2001); J. Zhang, T. Bhatt & G. Mandyam, *Efficient Linear Equalization for High Data Rate Downlink CDAM Signaling*, PROCEEDINGS OF ASILOMAR CONFERENCE (2003); and H. Nguyen, J. Zhang & B. Raghothaman, *Equalization of CDMA Downlink Channel via Kalman Filtering*, PROCEEDINGS OF ASILOMAR CONFERENCE (2003), the contents of all of which are incorporated herein by reference in their entireties.

After the chip-level equalizer 56, the orthogonality of the Walsh code is partially restored and all the transmitted symbols are detected with a descramble/despread element 60. As shown, the descramble/despread element can also descramble the transmitted signals. Thus, the descramble/despread element can output a descrambled and despread symbol stream to a deinterleaver/decoder element 62.

Defining an error vector of $z = d_i - w^H y_{i+F:i-F}$ (H being short for Hermitian), the SIMO LMMSE chip-level equalizer w is the solution of the following problem:

$$w^{opt} = \arg \min_w E \| d_i - w^H y_{i+F:i-F} \|^2 \quad (4)$$

whose optimal solution is given by:

$$w^{opt} = \sigma_d^2 R^{-1} h \quad (5)$$

where $R = E[y_{i+F:i-F} y_{i+F:i-F}^H]$ represents the correlation matrix of the received signal, and $\sigma_d^2$ represents the chip-level base station transmit power. Meanwhile, the channel estimate H is assumed stationary for a given processing block and is not a function of symbol index i. As described herein, however, $H_{i+F:i+1}$, h and $H_{i-1:i-F-L}$ represent the sub-matrices of H that are associated with $d_{i+F:i+1}$, $d_i$ and $d_{i-1:i-F-L}$, respectively, in the expansion of the matrix-vector product $$Hd_{i+F:i-F} \triangleq [H_{i+F:i+1} \quad h \quad H_{i-1:i-F-L}] \begin{bmatrix} d_{i+F:i+1} \\ d_i \\ d_{i-1:i-F-L} \end{bmatrix} \quad (6)$$

$$= H_{i+F:i+1} d_{i+F:i+1} + h d_i + H_{i-1:i-F-L} d_{i-1:i-F-L}$$

which will be used in the sequel.

II. Turbo/Iterative Receiver

Reference is now made to FIG. 4, which more particularly illustrates the detection/decoding element 54 of the receiver 28 in accordance with one embodiment of the present invention. In accordance with embodiments of the present invention, performance of the LMMSE equalizer 56 can be further improved by introducing an iterative process where a new LMMSE filter 64 (i.e., second element) is designed at each iteration to account for statistical information of the transmitted symbols y obtained from the output of the previous iteration. In this regard, the detection/decoding element of the receiver of embodiments of the present invention also includes a prior chip statistic update element 66 (i.e., first element) for providing, to the chip-level LMMSE filter, statistical information of the transmitted symbols y obtained from the output of the previous iteration. Further, the receiver can include an iteration update element 68 (u=u−1) capable of updating the iteration of the signals received by the receiver. As explained below, the statistical information can be generated from both a soft-symbol (iterative) feedback loop of the detection/decoding element and a soft-bit (turbo) feedback loop of the detection/decoding element. The iteration update element can then be capable of selecting either the soft-symbol generated statistical information or the soft-bit generated statistical information to provide to the prior chip statistic update element.

The underlying rational for this iterative process is to take advantage of the prior information such as modulation format and coding structure that is not used in the chip-level equalizer 56 of the conventional detection/decoding element 54. Note that, as shown, $b_{k,j,q}$ refers to those data bits that form the modulated symbol $a_{k,j}$, and q=1, ..., $\log_2 Q$ where Q refers to the constellation size. As indicated above and as shown in FIG. 4, the detection/decoding element includes two possible feedback paths providing feedback from a prior iteration, $L^{u-1}$, which can then be used to generate prior information for the next iteration. That is, the detection/decoding element includes (a) a turbo feedback path where the soft bits $b_{k,j,q}^{u-1}$ from the deinterleaver/decoder element 62 are fed back (i.e., $L^{u-1} = b_{k,j,q}^{u-1}$); and (b) an iterative feedback path where the soft symbols $a_{k,j}^{u-1}$ given by the descramble/despread element 60 are fed back (i.e., $L^{u-1} = a_{k,j}^{u-1}$).

As described herein, the receiver 28 of embodiments of the present invention may be referred to as a "turbo/iterative" receiver. As shown and described herein, the turbo/iterative receiver includes a number of elements, one or more of which may be capable of performing one or more functions similar to a conventional receiver. It should be understood that the elements of the turbo/iterative receiver of embodiments of the present invention can include hardware, firmware and/or software components capable of effectuating the functions of the respective elements. It should also be understood that one or more of the functions performed by one or more of the elements of the receiver can alternatively be performed by other elements of the terminal 12 such as, for example, the controller 30.

In accordance with embodiments of the present invention, a new LMMSE filter $w^u$ can be calculated at each iteration to provide a new estimate of the chips $\hat{d}_i^u$ based upon both the received signal y and the prior mean $\bar{d}_i^{u-1}$ and covariance $c_i^{u-1}$ of these chips, denoted by the following:

$$\bar{d}_i^{u-1} = E[d_i | L^{u-1}] \quad (7)$$

$$c_i^{u-1} \triangleq Cov(d_i, d_i | L^{u-1})$$

$$= E[|d_i - \bar{d}_i^{u-1}|^2 | L^{u-1}]$$

where $E[\cdot|\cdot]$ represents conditional expectation. Also in (7), $Cov(x,y|L) = E[xy^H|L] - E[x|L]E[y|L]$ represents the conditional covariance matrix. As will be appreciated, the LMMSE problem is actually similar to that of (4):

$$\min E\|d_i - \hat{d}_i^u\|^2 \quad (8)$$

where the estimator of $d_i$ assumes the form $\hat{d}_i^u \triangleq w^{u,H} y_{i+F:i-F} + v_i^u$, which is affine instead of linear as in (4), where $w^{u,H}$ (linear filter) and $v_i^u$ (offset) are to be determined. Given that $d_i$ has the prior mean and variance as shown in (7), the solution to (8) is given by the Gauss-Markov theorem as follows:

$$w_i^{u,opt} = Cov(y_{i+F:i-F}, y_{i+F:i-F})^{-1} Cov(y_{i+F:i-F}, d_i)$$

$$v_i^{u,opt} = E[d_i] - (w_i^{u,opt})^H E[y_{i+F:i-F}] \quad (9)$$

where $w_i^{u,opt}$ and $v_i^{u,opt}$ represent the optimal linear filter and offset, respectively, and the new chip estimate of $\hat{d}_i^u$ for the uth iteration is $$\hat{d}_i^u = \bar{d}_i^{u-1} + Cov(d_i, y_{i+F:i-F}) Cov(y_{i+F:i-F}, y_{i+F:i-F})^{-1} (y_{i+F:i-F} - E[y_{i+F:i-F}]) \quad (10)$$

For more information on the Gauss-Markov theorem, see L. SCHARF, STATISTICAL SIGNAL PROCESSING: DETECTION, ESTIMATION AND TIME SERIES ANALYSIS (1991).

Considering (7), then, it can be shown that $$E[y_{i+F:i-F}] = H\bar{d}_{i+F:i-F-L}^{u-1}$$

$$Cov(d_i, y_{i+F:i-F}) = c_i^{u-1} h^H$$

$$Cov(y_{i+F:i-F}, y_{i+F:i-F}) = \sigma_n^2 I + HC_i^{u-1} H^H \quad (11)$$

where $\bar{d}_{i+F:i-F-L}^{u-1} \triangleq [\bar{d}_{i+F}^{u-1}, \ldots, \bar{d}_{i-F-L}^{u-1}]^T$ and $C_i^{u-1} \triangleq \text{diag}[c_{i+F}^{u-1}, \ldots, c_{i-F-L}^{u-1}]$. And the chip estimate of (10) becomes $$\hat{d}_i^u = \bar{d}_i^{u-1} + c_i^{u-1} h^H (\sigma_n^2 I + HC_i^{u-1} H^H)^{-1} (y_{i+F:i-F} - H\bar{d}_{i+F:i-F-L}^{u-1}) \quad (12)$$

To validate the preceding, consider that the desired solution for the first iteration (i.e., u=1), is the same as the simple LMMSE algorithm previously derived. Then, from the initial conditions $\bar{d}_i^0 = 0$ and $c_i^0 = \sigma_d^2$ for all i, (12) can be reduced to $$\hat{d}_i^1 = \sigma_d^2 h^H V_i^{-1} y_{i+F:i-F}, \quad (13)$$

where $V_i \triangleq (\sigma_n^2 I + \sigma_d^2 HH^H)$ and the chip estimate is the same as that previously obtained from a conventional LMMSE receiver, proving the self-consistency of the solution.

As can be seen from a closer examination of (12), for proper operation, the matrix inversion $V_i^{-1}$ should be carried out for each chip i. Because carrying out such a matrix inversion for each chip may be difficult, if not impossible, for a practical system, in one embodiment, the chip covariances $c_i^{u-1}$ are approximated with the chip covariance averaged over the processing block:

$$c^{u-1} \triangleq \sum_{i=1}^{N_B} c_i^{u-1} / N_B \quad (14)$$

where $N_B$ represents the size of the processing block. Equation (12) can then be rewritten as follows:

$$\hat{d}_i^u = \bar{d}_i^{u-1} + c^{u-1} h^H V^{-1} (y_{i+F:i-F} - H\bar{d}_{i+F:i-F-L}^{u-1}), \quad (15)$$

where $V \triangleq \sigma_n^2 I + c^{u-1} HH^H$. After the chip estimate $\hat{d}_i^u$ becomes available for the uth iteration, it is straightforward to calculate the soft symbol estimates $\hat{a}_{k,j}^u$ and ultimately the soft bit estimates $\hat{b}_{k,j,q}^u$. To proceed, note that the symbol index j relates to the chip index i as $j = \lceil i/G \rceil$, where $\lceil \cdot \rceil$ denotes a ceiling operation. Collecting the G estimated chips over the jth symbol interval and representing the vector as $\hat{d}_j^u = [\hat{d}_{jG+1}^u, \ldots, \hat{d}_{jG+G}^u]^T$, then, the signal model of $\hat{d}_j^u$ can be given as follows:

$$\hat{d}_j^u = S_c(j) \sum_{k=1}^K \alpha_k p_k a_{k,j} + n_j^u, \quad (16)$$

where $p_k \triangleq [p_k(1), \ldots, p_k(G)]^T$ represents the kth Walsh code and $S_c(j) \triangleq \text{diag}[s_c(jG+1), \ldots, s_c(jG+G)]$ denotes the diagonal scrambling code matrix for the jth symbol interval. As also shown in (16), $n_j^u \triangleq [n_{jG+1}^u, \ldots, n_{jG+G}^u]^T$ where $n_i^u$ represents the post-filtering noise in (15), if one writes (15) as $\hat{d}_i^u \triangleq \hat{d}_i + n_i^u$. Recognizing the orthogonality of the Walsh codes, one can calculate the soft symbol $\hat{a}_{k,j}^{u-1}$ from (16) by:

$$\hat{a}_{k,j}^u = p_k^H S_c^H(j) \hat{d}_j^u \quad (17)$$
$$= (\alpha_k G) \cdot a_{k,j} + p_k^H S_c^H(j) n_j^u$$
$$\triangleq \beta_k \cdot a_{k,j} + n_{k,j}^u$$

where $\beta_k \triangleq \alpha_k G$ denotes effective symbol amplitude and $n_{k,j}^u \sim N(0, N_o^u)$ denotes effective symbol noise. If the iterative process behaves properly, the noise variance $N_o^u$ decreases as iteration number u increases. Finally, for completeness, it can also be noted that once $\hat{a}_{k,j}^u$ is available, the standard soft-demodulator and decoding process can be performed to obtain the soft bit estimates $\hat{b}_{k,j,q}^u$.

Attention will now be made to obtaining the prior statistics of $\bar{d}_i^{u-1}$ and $c_i^{u-1}$ from the soft symbol or soft bit estimates. This requires a little more work, since the soft symbol and soft bits are symbol-level quantities and the prior statistics are chip-level. Before explaining generation of the chip statistics, however, a number of practical issues are considered, including conditional unbiasedness, post-filtering SNR (Signal-to-Noise) estimation, and channel re-estimation at each iteration u. As will be appreciated, such practical issues can increase the performance advantage provided by the receiver 28 of embodiments of the present invention, especially for systems with variable-amplitude modulations such as 16 QAM.

A. Conditional Unbiasedness

For conditional unbiasedness, consider that for a random parameter, $\theta$, an estimate $\hat{\theta}$ is unbiased if the following condition is satisfied:

$$E[\hat{\theta}] = E[\theta] \quad (18)$$

This notion of unbiasedness, however, is sometimes inconvenient in communications problems. To illustrate this point, consider the simple problem where the observation y is given by $$y = \theta + n \quad (19)$$

where n is AWGN (Additive White Gaussian Noise) and $\theta$ is a zero-mean Gaussian random variable independent of n. Since y and $\theta$ are jointly Gaussian, the MMSE (Minimum Mean-Squared Error) estimate of $\theta$ is given by $$\hat{\theta} = E[\theta|y] = \sigma_\theta^2 (\sigma_y^2)^{-1} y = \sigma_\theta^2 (\sigma_y^2)^{-1} \theta + \sigma_\theta^2 (\sigma_y^2)^{-1} n \quad (20)$$

According to criteria (18), this estimate is unbiased since $E[\hat{\theta}] = E[E[\theta|y]] = E[\theta]$. From the right-hand side of (20), however, it can appear as though this estimate is "biased" since the true parameter $\theta$ is scaled by $\sigma_\theta^2 (\sigma_y^2)^{-1}$, which is less than unity in general. The confusion is caused by the criteria (18), where the expectation is taken over not only over the noise, but also over the distribution of $\theta$ itself. In communication problems, it can be desirable to refer to an "unbiased" situation as that where the signal part, or in this case the parameter $\theta$, is unscaled in the estimate $\hat{\theta}$. Thus, the expectation on the parameter itself can be removed, and the notion of conditioned unbiasedness can be introduced, the definition of conditioned unbiasedness being given by $$E[\hat{\theta}|\theta] = \theta \quad (21)$$

The estimate $\hat{\theta}$ in (20) can now be checked to verify that it is conditionally biased since $E[\hat{\theta}|\theta] = \sigma_\theta^2 (\sigma_y^2)^{-1} \theta \neq \theta$. Moreover, the bias in this case can be removed by a simple multiplicative factor. That is, $\hat{\theta}' = \hat{\theta}(\sigma_\theta^2)^{-1} \sigma_y^2$ is a conditionally unbiased estimate (although no longer an MMSE estimate).

With the preceding definitions, the chip estimate at each iteration can be examined to determine if the chip estimate is conditionally unbiased, and if not, how to remove that bias. The objective, then, can be to make sure that the constellation for the (soft) demodulator is properly scaled, which can be important, particularly for 16 QAM modulation. Thus, from (16) the following determinations can be made with respect to the chip estimates:

$$E[\hat{d}_i^u | d_i] = E[\bar{d}_i^{u-1} + c^{u-1} h^H V^{-1} (H d_{i+F:i-F-L} + \quad (22)$$
$$n - H\bar{d}_{i+F:i-F-L}^{u-1}) | d_i]$$
$$= c^{u-1} h^H V^{-1} h d_i + E[(1 - c^{u-1} h^H V^{-1} h) \bar{d}_i^{u-1} -$$
$$c^{u-1} h^H V^{-1} H_{\bar{i}} \bar{d}_{\bar{i}}^{u-1} +$$
$$c^{u-1} h^H V^{-1} H_{\bar{i}} d_{\bar{i}} + c^{u-1} h^H V^{-1} n | d_i]$$
$$= c^{u-1} h^H V^{-1} h d_i + E[(1 - c^{u-1} h^H V^{-1} h) \bar{d}_i^{u-1} -$$

-continued $$c^{u-1} h^H V^{-1} H_{\bar{i}} \bar{d}_i^{u-1} \mid d_i]$$

$\neq d_i$ in general, meaning this estimate is conditionally biased. In the above (22), $d_{\bar{i}} \triangleq d_{i+F:i-F-L} \backslash d_i$ represents the vector that includes all the elements in $d_{i+F:i-F-L}$ except $d_i$. Similarly, $H_{\bar{i}} \triangleq H \backslash h$ represents the vector that includes all the elements in H except h. Meanwhile, the last inequality can be derived from the fact that $E[d_{\bar{i}}|d_i]=0$ and $E[n|d_i]=0$. The conditional unbiasedness, then, can be removed in any of a number of different manners. For example, the scaling factor of $c^{u-1} h^H V^{-1} h$ in (22) can be removed by scaling the linear part of the chip estimate in (15) with $(c^{u-1} h^H V^{-1} h)^{-1}$ to get:

$$\hat{d}_i^u = \bar{d}_i^{u-1} + \frac{h^H V^{-1}}{h^H V^{-1} h} (y_{i+F:i-F} - H \bar{d}_{i+F:i-F-L}^{u-1}), \quad (23)$$

and consequently, $$E[\hat{d}_i^u \mid d_i^{u-1}] = d_i - \frac{h^H V^{-1}}{h^H V^{-1} h} E[H_{\bar{i}} \bar{d}_{\bar{i}}^{u-1} \mid d_i]. \quad (24)$$

Unfortunately, the second term in (24) is generally non-zero since $d_i$ and $\bar{d}_{\bar{i}}^{u-1}$ are not independent. In fact, $\bar{d}_{\bar{i}}^{u-1}$ relates to $d_i$ in a complicated non-linear fashion, as can be seen below when the prior mean $\bar{d}_{\bar{i}}^{u-1}$ is calculated. Therefore, an exact conditionally unbiased solution is generally computationally complex. The exception is at the first iteration when u=1. In such an instance, $\bar{d}_{\bar{i}}^0 = 0$ and the solution of (23) becomes an MVDR (Minimum Variance Distortionless Response) solution which is conditionally unbiased. Nevertheless, for 16 QAM modulation, the simple scaling in (23) can lead to significantly better performance than the non-scaled solution of (15).

B. Estimation of Post-Filtering Noise Variance and Effective Amplitude

In addition to conditional unbiasedness, estimation of the post-filtering SNR (Signal-to-Noise) can be considered at each iteration u, if so desired. In this regard, in (17), both the effective symbol amplitude $\beta_k$ and the post-filtering noise variance $N_o^u$ are generally unknown. For some systems, such as 1X-EVDO and HSDPA, $\beta k = \alpha_k G$ is either fixed (1X-EVDO) or can be obtained from the down-link control channel (HSDPA). However, this is typically not the case for 1X-EVDV where it is neither fixed nor available from the control channel. If the amplitude $\beta_k$ is known a priori, then an estimate of the noise power can be obtained by averaging over the energy of all symbols:

$$\hat{N}_o^u = \frac{1}{JK} \sum_{j=1}^{J} \sum_{k=1}^{K} |\hat{a}_{k,j}^u|^2 - \beta_k^2, \quad (25)$$

where J represents the number of symbols in each processing block, and K represents the number of active Walsh codes in the cell.

On the other hand, if the amplitude $\beta_k$ is not known a-priori, obtaining an estimate of the noise power is typically not as trivial. In accordance with one exemplary second-order technique, then, the noise estimate $\hat{N}_o^u$ can be generated from some other means, and (25) is rewritten to obtain an estimate of $\beta_k$:

$$\beta_k^2 = \frac{1}{JK} \sum_{j=1}^{J} \sum_{k=1}^{K} |\hat{a}_{k,j}^u|^2 - \hat{N}_o^u. \quad (26)$$

Then, the noise estimate can be obtained by starting from the scaled version of the chip estimate (24):

$$\hat{d}_i^u = \bar{d}_i^{u-1} + \frac{h^H V^{-1}}{h^H V^{-1} h} (y_{i+F:i-F} - H \bar{d}_{i+F:i-F-L}^{u-1}) \quad (27)$$

$$= d_i + \frac{h^H V^{-1}}{h^H V^{-1} h} [H_{\bar{i}}(d_{\bar{i}} - \bar{d}_{\bar{i}}^{u-1}) + n_{i+F:i-F-L}]$$

$$\triangleq d_i + n_i^u$$

where $n_i^u \triangleq \frac{h^H V^{-1}}{h^H V^{-1} h} [H_{\bar{i}}(d_{\bar{i}} - \bar{d}_{\bar{i}}^{n-1}) + n_{i+F:i-F-L}]$ represents the effective post-filtering noise for the ith chip. It can then be shown that $$E[|n_i^u|^2] = \frac{1}{h^H V^{-1} h} \quad (28)$$

where $\bar{V} \triangleq V - c^{u-1} h h^H$. Note that in the preceding, the average chip covariance $c^{u-1}$ has been employed instead of the ith chip covariance $c_i^{u-1}$. Also note that the preceding equations implicitly employ the identity $$\frac{h^H V^{-1}}{h^H V^{-1} h} = \frac{h^H \bar{V}^{-1}}{h^H \bar{V}^{-1} h}. \quad (29)$$

Thus, once $E[|n_i^u|^2]$ is obtained in accordance with (28), the noise flow $n_i^u \rightarrow n_j^u \rightarrow n_{j,k}^u$ can be followed to arrive at the final symbol-level noise estimate:

$$\hat{N}_o^u = G \cdot E[|n_i^u|^2] = \frac{G}{h^H V^{-1} h}. \quad (30)$$

Alternatively, in accordance with a higher order method for noise variance and amplitude estimation, the non-conjugate higher order statistics of the observed symbol $\hat{a}_{k,j}^u$ can first be calculated as:

$$E[(\hat{a}_{k,j}^u)^n] = \beta_k^n E[a_{k,j}^n] + E[(n_{k,j}^u)^n], \text{ for } n \geq 2, \quad (31)$$

where it can be implicitly assumed independence between the transmitted symbol and post-filtering noise. Furthermore, in most practical situations the law of large numbers results in a noise $n_{k,j}^u$ that is approximately complex Gaussian distributed, which leads to $$E[(n_{k,j}^u)^n] = 0, \text{ for } n \geq 2, \quad (32)$$

due to the circular symmetry of the complex Gaussian distribution. Consequently, non-conjugate higher order statistics of (31) can be rewritten as $$E[(\hat{a}_{k,j}{}^u)^n] = \beta_k{}^n E[a_{k,j}{}^n], \text{ for } n \geq 2. \quad (33)$$

Now, all that remains is to find an n such that $E[a_{k,j}{}^n] \neq 0$. In this regard, the choice of n turns out to be modulation dependent. That is, for QPSK and 16 QAM modulation, $E[a_{k,j}{}^n] \triangleq \gamma^n \neq 0$, if n=4t where t=1, ..., is a natural number. For 8PSK, on the other hand, $E[a_{k,j}{}^n] \triangleq \gamma^n \neq 0$, if n=8t where t=1, ..., is a natural number.

To illustrate the higher order technique for QPSK, consider that, for normalized QPSK constellation, $\gamma^n=1$ for any n=4t. As will be appreciated, it is desirable to select n as small as possible, and in this case n=4. An estimate of $\beta_k$ can then be obtained as:

$$\hat{\beta}_k = \sqrt[4]{\frac{1}{JK} \sum_{j=1}^{J} \sum_{k=1}^{K} (\hat{a}_{k,j}^u)^4} \quad (34)$$

While theoretically sound, the higher-order methods may require a larger data sample (several hundred symbols) to obtain a reliable estimate.

In addition to the second order and higher order methods, it should be appreciated that the noise variance and amplitude can be estimated in accordance with a number of other methods. For example, noise variance and amplitude can be estimated in accordance with the so-called Expectation Maximization (EM) method.

C. Channel Re-estimation at Each Iteration

Further, channel re-estimation can be considered at each iteration u. It should be noted that in the preceding discussion of the turbo/iterative receiver 28, it has been implicitly assumed that the channel estimates stay the same regardless of the iteration number. However, as more information regarding the transmitted signals is obtained at each iteration u, this information can be leveraged to obtain better channel estimates. In this regard, consider how channel estimation is obtained in a non-iterative receiver. For ease of exposition, assume that the channel is stationary over the processing block of $N_B$ chips, and obtain a single channel estimate. It can then be fairly straightforward to extend this to a "sliding window" type of estimation approach to account for a time-varying nature of the channel. Meanwhile, assume a known pilot amplitude $\alpha_p$ where $1 \leq p \leq K$, all one pilot symbol (i.e., $a_{p,j}=1$) and an all one pilot Walsh code (i.e., $p_p=[1, \ldots, 1]^T$). Given these assumptions and the signal models shown in (1) and (2), the channel can be estimated in accordance with the correlation method as follows:

$$\hat{h}_l^0 = \frac{1}{N_B} \sum_{i=1}^{N_B} s_c^*(i-l) y_i, \text{ for } l = 0, \ldots, L \quad (35)$$

At iteration u, the prior mean of the chips $\bar{d}_i^{u-1}$ is available from the previous iteration. However, it is often undesirable for the contribution from the pilot Walsh code to be included in $\bar{d}_i^{u-1}$. Thus, denoting the channel estimate at $(u-1)^{th}$ as $\hat{h}_l^{u-1}$ the contribution of $\bar{d}_i^{u-1}$ can be subtracted from $y_i$ and get $$y_{p,i}^u \triangleq y_i - \sum_{l=1}^{L} \hat{h}_l^{u-1} \bar{d}_{i-l}^{u-1} \quad (36)$$

$$= \sum_{l=0}^{L} (h_l d_{i-l} - \hat{h}_l^{u-1} \bar{d}_{i-l}^{u-1}) + n_i$$

$$= \sum_{l=0}^{L} h_l(d_{i-l} - \bar{d}_{i-l}^{u-1}) + n_i'$$

where $$n_i' \triangleq n_i + \sum_{l=1}^{L} (\hat{h}_l^{u-1} - h_l) \bar{d}_{i-l}^{u-1}$$

includes both the AWGN and the noise due to channel mismatch at the (u−1)th iteration. Now since $d_{i-1} - \bar{d}_{i-1}^{u-1}$ still includes the contribution from the pilot Walsh codes, the channel estimate for the uth iteration can be obtained similar to (35) as follows:

$$\hat{h}_l^u = \frac{1}{N_B} \sum_{i=1}^{N_B} s_c^*(i-l) y_{p,i}^u, \text{ for } l = 0, \ldots, L \quad (37)$$

At this point it should be noted that, at the cost of slightly higher complexity, the preceding process can be further improved by adopting the so-called blind de-correlating method. In such instances, the channel estimation can be recast as a blind single-user detection problem since the pilot Walsh code is the only active Walsh code in the interference-suppressed chip sequence $d_{i-1} - \bar{d}_{i-1}^{u-1}$. For more information on the blind de-correlating method, see L. Tong et al., Blind Decorrelating RAKE Receivers for Long-Code WCDMA, 51 IEEE Transactions on Signal Processing 1642-1655 (2003); and A. Weiss & B. Friedlander, Channel Estimation for DS-CDMA Down-Link with Aperiodic Spreading Codes, 47 IEEE Transactions on Communications 1561-1569 (1999), the contents of both of which are incorporated herein by reference in their entireties.

III. Calculating Chip-Level Prior Mean and Covariance

Attention is now made to generation of the chip statistics, namely the prior chip mean and covariance, $\bar{d}_i^{u-1}$ and $c_i^{u-1}$, from either the soft symbol estimates: $L^{u-1} = \hat{a}_{k,j}^{u-1}$, or the soft bit estimates: $L^{u-1} = \hat{b}_{k,j,q}^{u-1}$, from the previous iteration. First, consider that the soft bits $\hat{b}_{k,j,q}^{u-1}$ can be defined as the LLR (Log-Likelihood Ratio) of the following bit:

$$\hat{b}_{k,j,q}^{u-1} = \log \frac{Pr(b_{k,j,q}^{u-1} = 1)}{Pr(b_{k,j,q}^{u-1} = 0)} \quad (38)$$

Also, consider that the soft-symbol can be defined as the output signal of the de-spreader whose signal model is given, in accordance with (17), as follows:

$$\hat{a}_{k,j}^{u-1} = \beta_k a_{k,j} + n_{k,j}^{u-1}, \quad (39)$$

where $n_{k,j}^{u-1} \sim N(0, N_o^{u-1})$, and $\beta_k$ represents the effective post-filtering amplitude.

To proceed, assume that the terminal 12 is the only active device in its respective cell, meaning that information is known about all of the active Walsh codes, as well as modulation/coding information. Before examining this case in a more general setting with intra-cell data and voice interferer, consider that since the mean $\bar{d}_i$ and covariance $c_i$ are chip-level quantities, the mean and covariance cannot be directly generated from symbol-level quantities $L^{u-1}$. Therefore, the symbol-level prior mean and covariance can be calculated from $L^{u-1}$ in accordance with an intermediate step, as explained below.

A. Symbol-Level Prior Mean and Covariance

To calculate the symbol-level prior mean and covariance from $L^{u-1}$, consider two scenarios. If the feedback comes from the decoder output in the case of the previously described turbo feedback path (i.e., $L^{u-1} = \tilde{b}_{k,j,q}^{u-1}$), the symbol-level prior mean $\bar{a}_{k,j}^{u-1}$ and covariance $C_{k,j}^{u-1} \triangleq \mathrm{Cov}(a_{k,j}, a_{k,j} | L^{u-1})$ are given by $$\bar{a}_{k,j}^{u-1} = \sum_{e_h \in A} e_h Pr(a_{k,j} = e_h) \tag{40}$$

$$C_{k,j}^{u-1} = \left( \sum_{e_h \in A} |e_h|^2 \cdot Pr(a_{k,j} = e_h) \right) - |\bar{a}_{k,j}^{u-1}|^2 \tag{41}$$

where $A = \{e_1, \ldots, e_h, \ldots, e_Q\}$ represents the set of the constellation points in the complex plane. Meanwhile, the symbol probability mass function $Pr(a_{k,j} = e_h)$ can be given by the product of the bit probabilities:

$$Pr(a_{k,j} = e_h) = \prod_{q=1}^{\log Q} Pr(b_{k,j,q} = b_{h,q}) \tag{42}$$

$$= \prod_{q=1}^{\log Q} 1/2 \cdot \left[ 1 + (2b_{h,q} - 1) \tanh(\hat{b}_{k,j,q}^{u-1}) \right]$$

where $b_{h,q}$ denotes the qth bit of the constellation symbol $e_h$.

On the other hand, consider the feedback as coming from the descramble/despread element 60 as in the case of the previously described iterative feedback path (i.e., $L^{u-1} = \hat{a}_{k,j}^{u-1}$) where the soft symbols $\hat{a}_{k,j}^{u-1}$, as shown earlier in (39), assume the following signal model $$\hat{a}_{k,j}^{u-1} = \beta_k a_{k,j} + n_{k,j}^{u-1}, \tag{43}$$

In such an instance, it can be shown that the symbol-level prior mean is given by $$\bar{a}_{k,j}^{u-1} = E[a_{k,j} | \hat{a}_{k,j}^{u-1}] \tag{44}$$

$$= \frac{\sum_{e_h \in A} e_h \cdot \exp\left(-\frac{|\hat{a}_{k,j}^{u-1} - \beta_k e_h|^2}{N_o^{u-1}}\right)}{\sum_{e_h \in A} \exp\left(-\frac{|\hat{a}_{k,j}^{u-1} - \beta_k e_h|^2}{N_o^{u-1}}\right)}$$

and that the symbol-level prior covariance is given by $$C_{k,j}^{u-1} = E[|a_{k,j} - \bar{a}_{k,j}^{u-1}|^2 | \hat{a}_{k,j}^{u-1}] \tag{45}$$

$$= \frac{\sum_{e_h \in A} |e_h|^2 \cdot \exp\left(-\frac{|\hat{a}_{k,j}^{u-1} - \beta_k e_h|^2}{N_o^{u-1}}\right)}{\sum_{e_h \in A} \exp\left(-\frac{|\hat{a}_{k,j}^{u-1} - \beta_k e_h|^2}{N_o^{u-1}}\right)} - |\bar{a}_{k,j}^{u-1}|^2$$

B. Chip-Level Prior Mean and Covariance

Continue to assume that only one terminal 12 is present in a respective cell and all active Walsh codes will have the same length G. Collecting the G chips over the jth symbol interval and denoting the chip vector as $d_j = [d_{jG+1}, \ldots, d_{jG+G}]^T$, the chip vector can be represented as $$d_j = S_c(j) \sum_{k=1}^{K} \alpha_k p_k a_{k,j} \tag{46}$$

where $p_k$ represents the kth Walsh code, and $S_c(j) \triangleq \mathrm{diag}[s_c(jG+1), \ldots, s_c(jG+G)]$ denotes the diagonal scrambling code for the jth symbol interval. The prior mean and covariance of $d_j$ can then be given by:

$$\bar{d}_j^{u-1} = E[d_j | L^{u-1}] = S_c(j) \sum_{k=1}^{K} \alpha_k p_k \bar{a}_{k,j}^{u-1}, \tag{47}$$

$$C_j^{u-1} \triangleq \mathrm{Cov}(d_j, d_j | L^{u-1}) = \sum_{k=1}^{K} \alpha_k^2 p_k p_k^H C_{k,j}^{u-1}, \tag{48}$$

where the symbol-level priors (i.e., mean and covariance from a prior or previous 10 iteration) $\bar{a}_{k,j}^{u-1}$ and $C_{k,j}^{u-1}$ are calculated in accordance with (40)-(41) in the case of the turbo feedback loop, and in accordance with (44)-(45) in the case of the iterative feedback loop. As will be appreciated, the covariance matrix of the chip vector in equation (48) is not diagonal, indicating correlation between chip-level signals within the same symbol interval. However, in practice, this correlation can be neglected, instead focusing on the diagonal terms of the covariance matrix. Noticing that all the diagonal elements of $(p_k p_k^H)$ are one, the covariance can be approximated as $$C_j^{u-1} \approx \sum_{k=1}^{K} \alpha_k^2 C_{k,j}^{u-1} I_G \tag{49}$$

where $I_G$ indicates the identity matrix of size G×G, and the covariance for any chip $d_i$ is then given by $$c_i^{u-1} \approx \sum_{k=1}^{K} \alpha_k^2 C_{k, \lceil i/G \rceil}^{u-1} \tag{50}$$

where $\lceil \cdot \rceil$ denotes ceiling operation and $\lceil i/G \rceil$ indicates the index of the symbol interval including the chip $d_i$. On the other hand, the prior mean for the chip $d_i$, or $\bar{d}_i^{u-1}$, is given by the $(i-(\lceil i/G \rceil -1)G)$th element of the chip vector $d_{\lceil i/G \rceil}^{u-}$ where $d_j^{u-1}$ is given in (47). Furthermore, as previously explained, the average of the chip covariance can be obtained as follows:

$$c^{u-1} = \frac{1}{N_B} \sum_{i=1}^{N_B} c_i^{u-1} = \frac{1}{N_B} \sum_{i=1}^{N_B} \sum_{k=1}^{K} \alpha_k^2 C_{k,\lceil i/G \rceil}^{u-1} \qquad (51)$$

It has been described how to obtain, determine or otherwise calculate the chip-level prior mean and covariance, $\bar{d}_u^{u-1}$ and $c_u^{u-1}$, from the soft feedback of the (u−1)th iteration. However, up to this point it has been assumed that all K active Walsh codes are known at the terminal 12. In this regard, a more general setting with intra-cell data and voice interference from other concurrent downlink terminals is described below. Before describing this context, however, it should be noted that although voice traffic generally uses longer Walsh codes than data traffic, this difference does not fundamentally impact embodiments of the present invention, as is evident from (47) and (51). Therefore, for the purpose of notational simplicity, the same spreading length can be assumed for all Walsh codes. Some manner of adaptation may be required, however, to apply embodiments of the present invention to a variable spreading gain system.

C. Handling Intra-Cell Data and Voice Interference

As used in the following description, the communication system is configured in accordance with 1X-EVDV, and in addition to a data user (terminal 12) of interest, the communication system also includes are several voice users (terminals) and another data user in the same cell. Also, presume that the desired user is assigned $K_1$ Walsh codes, the other data user is assigned $K_2$ Walsh codes, and that there are $K_v$ voice users. The total number of active Walsh codes is again denoted as $K=K_1+K_2+K_v$. In the 1X-EVDV system, the Walsh code, modulation and coding information of both data users are broadcast and known at the terminal side, although the information about the interfering data user may not be very reliable due to power control. It is also known that voice traffic exclusively uses QPSK modulation. However, the active voice Walsh codes and the coding information for the voice traffic is generally unknown to data users.

Given such incomplete and sometimes unreliable knowledge about the intra-cell data and voice interference, it can be imperative that the turbo/iterative receiver 28 be able to operate without using such knowledge in a worst-case scenario. In the meantime, it can also be desirable for the turbo/iterative receiver to take advantage of this additional information for performance benefits, whenever such information can be deemed as reliable. Thus, the following description illustrates how the turbo/iterative receiver of embodiments of the present invention is flexible enough to meet both requirements. First consider the worst-case scenario where the user only assumes information about its own traffic, or the signal carried on the first $K_1$ Walsh codes. In such an instance, in accordance with embodiments of the present invention, the symbol-level mean and covariance for $K_1+1 \leq k \leq K$ can be expressed as follows:

$$\bar{a}_{k,j}^u = 0$$

$$C_{k,j}^u = 1 \qquad (52)$$

Also, the chip-level priors as shown in (47) and (51) become $$\bar{d}_j^{u-1} = S_c(j) \sum_{k=1}^{K_1} \alpha_k p_k \bar{a}_{k,j}^{u-1}, \qquad (53)$$

$$c^{u-1} = \frac{1}{N_B} \sum_{i=1}^{N_B} \left( \sum_{k=1}^{K_1} \alpha_k^2 C_{k,\lceil i/G \rceil}^{u-1} + \sum_{k=K_1+1}^{K} \alpha_k^2 \right)$$

$$= \frac{1}{N_B} \sum_{i=1}^{N_B} \left( \sum_{k=1}^{K_1} \alpha_k^2 C_{k,\lceil i/G \rceil}^{u-1} + \sigma_i^2 \right)$$

where $$\sigma_i^2 \triangleq \sum_{k=K_1+1}^{K} \alpha_k^2 = \sigma_d^2 - \sum_{k=1}^{K_1} \alpha_k^2 \qquad (54)$$

represents the overall intra-cell interference power, which can be calculated once the total chip power $\sigma_d^2$, and where the (desired) traffic power $$\sum_{k=1}^{K_1} \alpha_k^2$$

are estimated.

Having dealt with the worst-case scenario, now consider the other extreme where the user tries to obtain a prior estimate of all the data and voice interferences. For the data interference, as long as the Walsh code, coding and modulation information are reliable, calculation of the symbol-level priors (i.e., $\bar{a}_{k,j}^{u-1}$ and $C_{k,j}^{u-1}$, $k=K_1+1, \ldots, K_1+K_2$) is the same as that of the desired user. Thus, both types of feedbacks, the soft symbol (iterative feedback path) or soft bits (turbo feedback path), are possible. In various practical instances, however, it may not be feasible to use soft bit type of feedback from the other data user due to security or privacy concerns.

For voice interference, on the other hand, the situation is a little different. For this interference, the user (terminal 12) may know that voice users are QPSK modulated, but not know the coding information, meaning that the user may be limited to the soft symbol (iterative) type of feedback. Moreover, as the user may need to know which Walsh codes are active, an energy detection process can be performed where the average symbol energy on all the possible non-data Walsh codes are compared to determine the active Walsh codes. In this regard, FIG. 5 illustrates the power profile for a case where there are two voice users in the communication system 10, each sharing approximately six percent of total base station transmit power in a low SNR environment (geometry=4). In this case, these two voice users (user one and user two) are well above the noise floor and are hard to miss.

Having covered both extremes of the spectrum, it should be noted that in most practical situations, some success may be achieved in obtaining priors of some interference but not others. Advantageously, the turbo/iterative receiver 28 of embodiments of the present invention provides the much desired flexibility by working with worse-case scenario with no knowledge of the interferences, while also providing progressive performance improvement as additional information about the interference becomes available.

IV. Simulation Results

As explained below, to further illustrate the benefits of embodiments of the present invention, a number of simulations were performed in the case of 1X-EVDV and 1X-EVDO wireless communication systems 10. In the simulations, the frame error rate (FER) is used as the performance criterion evaluated over a range of geometry or received SNR. Also, the simulations assume a single transmit antenna 52, single receive antenna $24_1$ single-input single-output (SISO) configuration.

A. 1X-EVDV Results

To illustrate performance of the turbo/iterative receiver 28 in a simulated 1X-EVDV system, consider three different cases whose parameters are shown in Table 1 below. In the QPSK32 and QAM 65 case, all available base stations 14 transmit power, in this case 90%, is assigned to the desired traffic user (terminal 12) while in the QAM 102 case, only part of the base station transmit power, in this case 50%, is assigned to the desired user and the other 40% of the transmit power is assigned to intra-cell data and voice interferers.

TABLE 1

Three sets of 1X-EVDV simulation parameters

|  | Parameter Name | | |
| --- | --- | --- | --- |
|  | QPSK32 | QAM65 | QAM102 |
| Channel Profile | Veh A | Veh A | Veh A |
| Mobile Speed (km/h) | 30 | 30 | 30 |
| Modulation | QPSK | 16 QAM | 16 QAM |
| Information Data Rate(kbps) | 932.1 | 932.1 | 624 |
| Turbo Code Rate | 0.7132 | 0.5511 | 0.6771 |
| Pilot Power | 10% | 10% | 10% |
| Traffic Power | 90% | 90% | 50% |
| Num of Traffic Walsh Codes | 17 | 11 | 6 |

1) QPSK32 Case

The performance of the turbo/iterative receiver 28 for the QPSK32 case is shown in FIGS. 6 and 7. Since all available traffic power is assigned to the desired user (terminal 12), both types of feedback, namely the soft-symbol (iterative) and the soft-bit (turbo) feedback, can be used. FIG. 6 shows the performance of the turbo/iterative receiver operating with soft-symbol (iterative) feedback. FIG. 7 shows the performance of the turbo/iterative receiver, where the decoder 62 is in the iterative loop and soft-bit (turbo) feedback is used.

Since the gap between the simple LMMSE and the matched filter bound is small (about 2 dB) to begin with, the performance gain achieved by turbo/iterative receiver 28 operating with soft-symbol feedback is limited in this case. In such an instance, the gain is about 1 dB after the 2nd iteration and stagnates thereafter. Operating with the soft-bit feedback, on the other hand, the performance keeps improving with each iteration, with an overall gain of about 1.5 dB after the 4th iteration.

2) QAM65 Case

In the QAM65 case, again all available traffic power is assigned to the desired user (terminal 12), both types of feedback, namely the soft-symbol (iterative) feedback and the soft-bit (turbo) feedback, can be used. Performance of the receiver 28 operating with soft-symbol feedback is shown in FIG. 8, and the performance of the receiver operating with soft-bit feedback is shown in FIG. 9. Note that in this case, since the gap between the simple LMMSE and the matched filter bound is large, the gain achieved by the receiver operating with soft-symbol feedback is much more significant than in the QPSK32 case. For the receiver operating with soft-symbol feedback, the gain over the simple LMMSE process is about 2.5 dB after the 3rd iteration and stagnates thereafter. For the receiver operating with soft-bit feedback, on the other hand, the gain is about 3 dB after the 5th iteration, and the performance is within 1 dB of the matched filter bound.

Note that these results can also be achieved with the scaled version of the chip re-estimate in (23), where the scaling ensures approximate conditional unbiasedness of the chip estimate. In this regard, FIG. 10 illustrates performance of the receiver 28 with the original biased LMMSE solution of (15) in the receiver operating with soft-symbol (iterative) feedback. In this case, the gain from iterative process is less than 0.5 dB with the biased chip re-estimate. FIG. 10 shows that for a 16QAM modulated system, the removal of the conditional bias facilitates achieving the desired performance gain of the receiver operating with soft-bit (turbo) feedback.

3) QAM102 Case

The QAM102 case is different from the previous two cases in that in QAM102, the desired user (terminal 12) is assigned only 50% of the total base station power, and the other 40% base station power is assigned to a mixture of other data and voice users (terminals) within the same cell of the system 10. For the QAM102 case, focus is drawn to the receiver 28 operating with soft-symbol (iterative) feedback partly because the soft-bit (turbo) feedback needed for the receiver can be difficult to obtain for the interfering data and voice users.

Previously, Section III-C explained two scenarios for treating the interfering signals. In the worst-case scenario, the receiver 28 typically does not attempt to detect the interfering signals at all, but accounts for their influence with a single covariance term $\sigma_i^2$, as shown in (53)-(54). The performance of the receiver operating with soft-symbol (iterative) feedback, and without interference feedback, is shown in FIG. 11. As can be seen, although the performance gain is limited to about 1 dB, the fact that performance does not degrade illustrates the robustness of the receiver. On the other hand, with the assumption that the interfering Walsh codes are properly detected and interference feedback is used in the receiver operating with soft-symbol feedback, the performance gain becomes much more significant, as shown in FIG. 12.

B. 1X-EVDO Results

In the case of a simulated 1X-EVDO system, performance of the turbo/iterative receiver 28 operating with soft-symbol (iterative) feedback was evaluated under three different 1X-EVDO modulation and coding schemes (MCS) whose specifications are listed in Table 2 below along with the channel model used in each case. It should be understood that, although performance of the receiver operating with soft-bit (turbo) feedback is not evaluated herein, the soft-bit feedback technique may exhibit performance gains similar to those under the 1X-EVDV standard.

TABLE 2

1X-EVDO configurations and simulation parameters

|  | MCS number | | |
| --- | --- | --- | --- |
|  | 9 | 11 | 12 |
| Modulation | QPSK | 8-Phase | 16-QAM |
| Data Rate (kbps) | 1228.8 | 1843.2 | 2457.6 |
| Turbo Code Rate | 1/3 | 1/3 | 1/3 |
| No. of Traffic Walsh Codes | 16 | 16 | 16 |
| Spreading Gain | 16 | 16 | 16 |

TABLE 2-continued

1X-EVDO configurations and simulation parameters

| | MCS number | | |
|---|---|---|---|
| | 9 | 11 | 12 |
| Channel Profile | Veh A | Veh A | Veh A |
| Mobile Speed (km/h) | 50 | 50 | 30 |

Since the frame structure of the EVDO standard is quite different from that of the EVDV standard, a brief description thereof is in order. First of all, the DO standard has a time division multiplex (TDM) structure. Each physical layer downlink frame includes multiple slots, each having a duration equivalent to 2048 chips. Each slot belonging to the desired user (terminal 12) is separated from the next slot by three slots belonging to other users (terminals). A pilot burst of 96 chips is inserted into the frame every half-slot duration so that there are two pilot bursts in each slot. If each slot is divided into two equal half-slots, then each half-slot contains one pilot burst symmetrically about its center. In addition, since the transmit power is maintained constant and all 16 Walsh spreading codes are used over the entire EVDO frame, the scaling-factor ambiguity which exists in EVDV due to dynamic power allocation and transmit power fluctuations does not exist in EVDO. Thus, from the equalizer point of view, each EVDO slot looks like an "ideal" EVDV slot where all active Walsh codes belong to the desired user and the transmit power are known. For more information on the EVDO frame structure and specifications, see Telecommunications Industry Association (TIA) standard TIA-85-A, entitled: *cdma2000® High Rate Packet Data Air Interface Specification* (2004).

Due to the given frame structure, only one pilot-based channel estimate is available within each half-slot. Thus, at the 0-th iteration (before iterations begin,) the LMMSE filter 68 can be updated at most once every half-slot. For the simulations presented herein, the equalizer is updated once per half-slot at the 0-th iteration. For subsequent iterations, soft-decision symbols are used to produce two channel estimates outside of the pilot burst within each half-slot. Hence, the receiver 28 operating with soft-symbol (iterative) feedback is updated twice per half-slot.

The FER performance of the turbo/iterative receiver 28 operating with soft-symbol (iterative) feedback for three EVDO configurations is shown in FIGS. 13, 14 and 15 in order of increasing data rate. For comparison purposes, the matched filter bound and performance of a conventional Rake receiver is also shown. As is well known to those skilled in the art, channel estimation within the Rake receiver is performed over all pilot bursts within each frame. The channel estimates obtained from the pilot bursts are passed through a linear interpolator to estimate the channel impulse response outside the pilot bursts. On the other hand, the matched filter bound is based on two channel estimates per half-slot obtained from the actual transmitted data. Therefore, the matched filter performance here represents an optimistic bound.

According to one aspect of the present invention, all or a portion of the terminal of embodiments of the present invention generally operate under control of one or more computer program products. The computer program product(s) for performing the methods of embodiments of the present invention includes at least one computer-readable storage medium, such as the non-volatile storage medium, and computer-readable program code portions, such as a series of computer instructions, embodied in the computer-readable storage medium.

In this regard, FIG. 4 is a control flow block diagram of methods, systems and program products according to the invention. It will be understood that each block or step of the control flow block diagram, and combinations of blocks in the control flow block diagram, can be implemented by computer program instructions. These computer program instructions may be loaded onto a computer or other programmable apparatus to produce a machine, such that the instructions which execute on the computer or other programmable apparatus create means for implementing the functions specified in the control flow block diagram block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the control flow block diagram block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the control flow block diagram block(s) or step(s).

Accordingly, blocks or steps of the control flow block diagram support combinations of means for performing the specified functions, combinations of steps for performing the specified functions and program instruction means for performing the specified functions. It will also be understood that each block or step of the control flow block diagram, and combinations of blocks or steps in the control flow block diagram, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for processing a signal received from a spread-spectrum downlink channel, the method comprising:
receiving the signal from the downlink channel; and
generating an estimate of a transmitted chip sequence in accordance with an iterative process, the iterative process comprising:
selecting soft bits or soft symbols for a previous iteration of a transmitted chip sequence, both the soft bits and soft symbols being separately and individually available for selection;
calculating statistical information for the previous iteration of the transmitted chip sequence, the statistical information being calculated as a function of the selected soft bits or soft symbols for the previous iteration of the transmitted chip sequence; and generating the estimate for a current iteration of the chip sequence based upon the statistical information for the previous iteration and the signal received from the downlink channel.

2. A method according to claim 1, wherein calculating statistical information comprises calculating a mean and a covariance for a previous iteration of a transmitted chip sequence.

3. A method according to claim 2, wherein calculating a mean for a previous iteration comprises calculating a mean for a previous iteration, $\bar{d}_i^{u-1}$, in accordance with the following:

$$\bar{d}_i^{u-1} = E[d_i|L^{u-1}],$$

wherein i represents a chip index, u represents an iteration, $d_i$ represents the transmitted chip sequence, $L^{u-1}$ represents feedback from a previous iteration, and $E[\bullet|\bullet]$ represents a conditional expectation.

4. A method according to claim 2, wherein calculating a covariance for a previous iteration comprises calculating a covariance for a previous iteration, $c_i^{u-1}$, in accordance with the following:

$$c_i^{u-1} = E[|d_i - \bar{d}_i^{u-1}|^2 | L^{u-1}]$$

wherein i represents a chip index, u represents an iteration, $d_i$ represents the transmitted chip sequence, $L^{u-1}$ represents feedback from a previous iteration, and $E[\bullet|\bullet]$ represents a conditional expectation.

5. A method according to claim 2, wherein calculating a mean and covariance comprises calculating a mean and covariance for a previous iteration of a transmitted chip sequence based upon a chip-level mean and covariance for a previous iteration of the transmitted chip sequence, the chip-level mean and covariance being calculated based upon a symbol-level mean and covariance for the previous iteration.

6. A method according to claim 1, wherein generating an estimate comprises generating a conditionally unbiased estimate of a transmitted chip sequence.

7. A method according to claim 1, wherein selecting soft bits or soft symbols comprises selecting soft bits or soft symbols based upon a type of spread-spectrum communication according to which the signal is received from the downlink channel.

8. A method according to claim 7, wherein selecting soft bits or soft symbols comprises selecting soft bits or soft symbols further based upon a modulation of the signal received from the downlink channel.

9. A method according to claim 1, wherein generating the estimate for the current iteration comprises generating the estimate for the current iteration of the chip sequence, $\hat{d}_i^u$, in accordance with the following:

$$\hat{d}_i^u = \bar{d}_i^{u-1} + Cov(d_i, y_{i+F:i-F}) Cov(y_{i+F:i-F}, y_{i+F:i-F})^{-1} (y_{i+F:i-F} - E[y_{i+F:i-F}]).$$

wherein i represents a chip index, u represents an iteration, $\bar{d}_i^{u-1}$ represents a mean for a previous iteration, $d_i$ represents the transmitted chip sequence, F is a measure of a length of a filter, and y represents a model of the signal received from the downlink channel.

10. A method according to claim 1, wherein generating the estimate for the current iteration comprises generating the estimate based upon an optimal linear filter, $w_i^{u,opt}$, and an optimal offset, $v_i^{u,opt}$, the optimal linear filter and optimal offset being calculated in accordance with the following:

$$w_i^{u,opt} = Cov(y_{i+F:i-F}, y_{i+F:i-F})^{-1} Cov(y_{i+F:i-F}, d_i)$$

$$v_i^{u,opt} = E[d_i] - (w_i^{u,opt})^H E[y_{i+F:i-F}]$$

wherein i represents a chip index, u represents an iteration, $d_i$ represents the transmitted chip sequence, F is a measure of a length of a filter, y represents a model of the signal received from the downlink channel, and $E[\bullet|\bullet]$ represents a conditional expectation.

11. A system for receiving a signal from a spread-spectrum downlink channel, the system comprising:
  a base station capable of transmitting a signal on the downlink channel; and
  a terminal capable of receiving the signal from the downlink channel, and generating an estimate of a transmitted chip sequence in accordance with an iterative process, wherein the iterative process comprises:
  selecting soft bits or a soft symbols for a previously iteration of a transmitted chip sequence, both the soft bits and soft symbols being seperately and individually available for selection;
  calculating statistical information for the previous iteration of the transmitted chip sequence, the statistical information being calculated as a function of the selected soft bits and soft symbols of the previous iteration of the transmitted chip sequence; and
  generating the estimate for a current iteration of the chip sequence based upon the statistical information.

12. A system according to claim 11, wherein calculating statistical information comprises calculating a mean and a covariance for a previous iteration of a transmitted chip sequence.

13. A system according to claim 12, wherein calculating a mean for a previous iteration comprises calculating a mean for a previous iteration, $\bar{d}_i^{u-1}$, in accordance with the following:

$$\bar{d}_i^{u-1} = E[d_i|L^{u-1}],$$

wherein i represents a chip index, u represents an iteration, $d_i$ represents the transmitted chip sequence, $L^{u-1}$ represents feedback from a previous iteration, and $E[\bullet|\bullet]$ represents a conditional expectation.

14. A system according to claim 12, wherein calculating a covariance for a previous iteration comprises calculating a covariance for a previous iteration, $c_i^{u-1}$, in accordance with the following:

$$c_i^{u-1} = E[|d_i - \bar{d}_i^{u-1}|^2 | L^{u-1}]$$

wherein i represents a chip index, u represents an iteration, $d_i$ represents the transmitted chip sequence, $L^{u-1}$ represents feedback from a previous iteration, and $E[\bullet|\bullet]$ represents a conditional expectation.

15. A system according to claim 12, wherein calculating a mean and covariance comprises calculating a mean and covariance for a previous iteration of a transmitted chip sequence based upon a chip-level mean and covariance for a previous iteration of the transmitted chip sequence, the chip-level mean and covariance being calculated based upon a symbol-level mean and covariance for the previous iteration.

16. A system according to claim 12, wherein generating an estimate comprises generating a conditionally unbiased estimate of a transmitted chip sequence.

17. A system according to claim 12, wherein the base station is configured to transmit a signal in accordance with a type of spread-spectrum communication, and wherein selecting soft bits or soft symbols comprises selecting soft bits or soft symbols based upon the type of spread-spectrum communication according to which the signal is received from the downlink channel.

18. A system according to claim 17, wherein the base station is configured to transmit a modulated signal, and wherein selecting soft bits or soft symbols comprises selecting soft bits or soft symbols further based upon the modulation of the signal received from the downlink channel.

19. An apparatus for receiving a signal from a spread-spectrum downlink channel, the apparatus comprising:
a receiver configured to generate an estimate of a transmitted chip sequence from the signal in accordance with an iterative process, the iterative process comprising:
selecting soft bits or soft symbols for a previous iteration of a transmitted chip sequence, both the soft bits and soft symbols being separately and individually available for selection;
calculating statistical information for the previous iteration of the transmitted chip sequence, the statistical information being calculated as a function of the selected soft bits or soft symbols for the previous iteration of the transmitted chip sequence; and
generating the estimate for a current iteration of the chip sequence based upon the statistical information.

20. An apparatus according to claim 19, wherein calculating statistical information comprises calculating a mean and a covariance for a previous iteration of a transmitted chip sequence.

21. An apparatus according to claim 20, wherein calculating a mean for a previous iteration comprises calculating a mean for a previous iteration, $\bar{d}_i^{u-1}$, in accordance with the following:

$$\bar{d}_i^{u-1} = E[d_i | L^{u-1}],$$

wherein i represents a chip index, u represents an iteration, $d_i$ represents the transmitted chip sequence, $L^{u-1}$ represents feedback from a previous iteration, and $E[\bullet|\bullet]$ represents a conditional expectation.

22. An apparatus according to claim 20, wherein calculating a covariance for a previous iteration comprises calculating a covariance for a previous iteration, $c_i^{u-1}$, in accordance with the following:

$$c_i^{u-1} = E[|d_i - \bar{d}_i^{u-1}|^2 | L^{u-1}]$$

wherein i represents a chip index, u represents an iteration, $d_i$ represents the transmitted chip sequence, $L^{u-1}$ represents feedback from a previous iteration, and $E[\bullet|\bullet]$ represents a conditional expectation.

23. An apparatus according to claim 20, wherein calculating a mean and covariance comprises calculating a mean and covariance for a previous iteration of a transmitted chip sequence based upon a chip-level mean and covariance for a previous iteration of the transmitted chip sequence, the chip-level mean and covariance being calculated based upon a symbol-level mean and covariance for the previous iteration.

24. An apparatus according to claim 19, wherein generating an estimate comprises generating a conditionally unbiased estimate of a transmitted chip sequence.

25. An apparatus according to claim 19, wherein the apparatus is configured to receive the signal in accordance with a type of spread-spectrum communication, and wherein selecting soft bits or soft symbols comprises selecting soft bits or soft symbols based upon the type of spread-spectrum communication according to which the signal is received from the downlink channel.

26. An apparatus according to claim 25, wherein the apparatus is configured to receive a modulated signal, and wherein selecting soft bits or soft symbols comprises selecting soft bits or soft symbols further based upon the modulation of the signal received from the downlink channel.

27. An apparatus for processing a signal from a spread-spectrum downlink channel, the apparatus including a detection/decoding element configured to receive the signal from the downlink channel, and generate an estimate of a transmitted chip sequence in accordance with an iterative process, the detection/decoding element comprising:
a first element configured to select soft bits or soft symbols for a previous iteration of a transmitted chip sequence, both the soft bits and soft symbols being separately and individually available for selection;
a second element configured to calculate statistical information for the previous iteration of the transmitted chip sequence, the statistical information being calculated as a function of the selected soft bits or soft symbols for the previous iteration of the transmitted chip sequence; and
a third element configured to generate the estimate for a current iteration of the chip sequence based upon the statistical information.

28. An apparatus according to claim 27, wherein the second element is configured to calculate a mean and a covariance for a previous iteration of a transmitted chip sequence.

29. An apparatus according to claim 28, wherein the second element is configured to calculate the mean for a previous iteration, $\bar{d}_i^{u-1}$, in accordance with the following:

$$\bar{d}_i^{u-1} = E[d_i | L^{u-1}],$$

wherein i represents a chip index, u represents an iteration, $d_i$ represents the transmitted chip sequence, $L^{u-1}$ represents feedback from a previous iteration, and $E[\bullet|\bullet]$ represents a conditional expectation.

30. An apparatus according to claim 28, wherein the second element is configured to calculate the covariance for a previous iteration, $c_i^{u-1}$, in accordance with the following:

$$c_i^{u-1} = E[|d_i - \bar{d}_i^{u-1}|^2 | L^{u-1}]$$

wherein i represents a chip index, u represents an iteration, $d_i$ represents the transmitted chip sequence, $L^{u-1}$ represents feedback from a previous iteration, and $E[\bullet|\bullet]$ represents a conditional expectation.

31. An apparatus according to claim 28, wherein the second element is configured to calculate the mean and covariance for a previous iteration of a transmitted chip sequence based upon a chip-level mean and covariance for a previous iteration of the transmitted chip sequence, the chip-level mean and covariance being calculated based upon a symbol-level mean and covariance for the previous iteration.

32. An apparatus according to claim 27, wherein the third element is configured to generate a conditionally unbiased estimate of a transmitted chip sequence.

33. An apparatus according to claim 27, wherein the first element is configured to select soft bits or soft symbols based upon a type of spread-spectrum communication according to which the signal is received from the downlink channel.

34. An apparatus according to claim 33, wherein the first element is configured to select soft bits or soft symbols further based upon a modulation of the signal received from the downlink channel.

* * * * *

UNITED STATES PATENT AND TRADEMARK OFFICE
CERTIFICATE OF CORRECTION

| | | |
|---|---|---|
| PATENT NO. | : 7,551,664 B2 | Page 1 of 1 |
| APPLICATION NO. | : 10/943565 | |
| DATED | : June 23, 2009 | |
| INVENTOR(S) | : Zhang et al. | |

It is certified that error appears in the above-identified patent and that said Letters Patent is hereby corrected as shown below:

Column 8,

Line 46, "*CDAM*" should read --*CDMA*--.

Column 26,

Line 8, "capable of transmitting" should read --configured to transmit--;

Line 10, "capable of receiving" should read --configured to receive--;

Line 11, "generating" should read --generate--;

Line 14, cancel "a", first occurrence and "previously" should read --previous--;

Line 21, "and" should read --or--.

Signed and Sealed this

Fifth Day of January, 2010

David J. Kappos
*Director of the United States Patent and Trademark Office*